United States Patent
Seo et al.

(10) Patent No.: US 9,439,189 B2
(45) Date of Patent: Sep. 6, 2016

(54) METHOD AND DEVICE FOR TRANSMITTING ACK/NACK IN CARRIER AGGREGATING SYSTEM

(71) Applicant: LG ELECTRONICS INC., Seoul (KR)

(72) Inventors: Dongyoun Seo, Anyang-si (KR); Bonghoe Kim, Anyang-si (KR); Joonkui Ahn, Anyang-si (KR); Suckchel Yang, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 61 days.

(21) Appl. No.: 14/378,911

(22) PCT Filed: Feb. 20, 2013

(86) PCT No.: PCT/KR2013/001346
§ 371 (c)(1),
(2) Date: Aug. 14, 2014

(87) PCT Pub. No.: WO2013/125860
PCT Pub. Date: Aug. 29, 2013

(65) Prior Publication Data
US 2016/0021655 A1 Jan. 21, 2016

Related U.S. Application Data

(60) Provisional application No. 61/600,995, filed on Feb. 20, 2012, provisional application No. 61/669,119, filed on Jul. 8, 2012, provisional application No. 61/673,719, filed on Jul. 19, 2012.

(51) Int. Cl.
*H04W 72/04* (2009.01)
*H04L 1/18* (2006.01)
(Continued)

(52) U.S. Cl.
CPC ........ *H04W 72/0446* (2013.01); *H04L 1/1829* (2013.01); *H04L 5/0055* (2013.01); *H04W 76/023* (2013.01); *H04W 76/028* (2013.01)

(58) Field of Classification Search
CPC ................................................. H04W 72/0446
See application file for complete search history.

(56) References Cited

U.S. PATENT DOCUMENTS

| | | | |
|---|---|---|---|
| 9,060,357 B2* | 6/2015 | Ji | H04W 72/0406 |
| 2012/0039278 A1* | 2/2012 | Park | H04W 72/1278 370/329 |

(Continued)

FOREIGN PATENT DOCUMENTS

| | | |
|---|---|---|
| KR | 10-2011-0084964 | 7/2011 |
| KR | 10-2011-0084976 | 7/2011 |

(Continued)

OTHER PUBLICATIONS

Huawei, "UL ACK/NACK resource allocation for carrier aggregation," 3GPP TSG RAN WG1 Meeting #59bis, R1-100243, Jan. 2010, 6 pages.

(Continued)

*Primary Examiner* — Jason Mattis
(74) *Attorney, Agent, or Firm* — Lee, Hong, Degerman, Kang & Walmey; Jonathan Kang; Michael Monaco

(57) ABSTRACT

The present invention relates to a method of transmitting an acknowledgement/not-acknowledgement (ACK/NACK) and a device for using such a method. According to the present invention, a cell-specific downlink-uplink setting for one of a plurality of serving cells and a reference UL-DL setting is received, an effective downlink sub-frame capable of actually receiving a data unit from one serving cell is determined based on the settings, and only an ACK/NACK for the effective downlink sub-frame is configured as a bit string and fed back.

8 Claims, 17 Drawing Sheets

(51) Int. Cl.
*H04L 5/00* (2006.01)
*H04W 76/02* (2009.01)

(56) References Cited

U.S. PATENT DOCUMENTS

| | | | | |
|---|---|---|---|---|
| 2012/0213170 | A1* | 8/2012 | Choi | H04L 1/1864 370/329 |
| 2013/0039231 | A1* | 2/2013 | Wang | H04W 72/10 370/280 |
| 2013/0215823 | A1* | 8/2013 | Shin | H04L 5/001 370/328 |
| 2013/0301586 | A1* | 11/2013 | Fan | H04L 1/0073 370/329 |
| 2014/0029489 | A1* | 1/2014 | Han | H04L 1/1812 370/280 |

FOREIGN PATENT DOCUMENTS

| | | |
|---|---|---|
| KR | 10-2011-0090521 | 8/2011 |
| WO | 2011/156967 | 12/2011 |

OTHER PUBLICATIONS

PCT International Application No. PCT/KR2013/001346, Written Opinion of the International Searching Authority dated May 29, 2013, 1 page.

* cited by examiner

METHOD AND DEVICE FOR TRANSMITTING ACK/NACK IN CARRIER AGGREGATING SYSTEM

CROSS-REFERENCE TO RELATED APPLICATIONS

This application is the National Stage filing under 35 U.S.C. 371 of International Application No. PCT/KR2013/001346, filed on Feb. 20, 2013, which claims the benefit of U.S. Provisional Application Ser. No. 61/600,995, filed on Feb. 20, 2012, 61/669,119, filed on Jul. 8, 2012, and 61/673,719, filed on Jul. 19, 2012, the contents of which are all hereby incorporated by reference herein in their entirety.

BACKGROUND OF THE INVENTION

1. Field of the Invention

The present invention relates to wireless communications, and more particularly, to a method and apparatus for transmitting acknowledgement (ACK)/not-acknowledgement (NACK) indicating a reception confirmation in a carrier aggregation system.

2. Related Art

Long term evolution (LTE) based on $3^{rd}$ generation partnership project (3GPP) technical specification (TS) release 8 is a promising next-generation mobile communication standard.

Although a carrier having various bandwidths is provided in LTE, it is premised that communication is performed basically using one carrier.

Meanwhile, 3GPP LTE-advanced (A) which is an evolution of 3GPP LTE is under development. A carrier aggregation (CA) is a technique employed in the 3GPP LTE-A.

The CA uses a plurality of component carriers (CCs). The CC is defined with a center frequency and a bandwidth. One downlink (DL) CC or a pair of an uplink (UL) CC and a DL CC corresponds to one cell. When a user equipment receives a service by using a plurality of DL CCs, it can be said that the user equipment receives the service from a plurality of serving cells.

It is premised that the conventional carrier aggregation system aggregates cells which operate with FDD or aggregates cells which use the same UL-DL configuration while operating with TDD.

However, a future wireless communication system considers a case of aggregating a cell operating with FDD and a cell operating with TDD or a case of aggregating cells operating with TDD when each cell uses a different UL-DL configuration.

As such, in case of aggregating cells to which different configurations are applied, ACK/NACK may not be effectively transmitted when using a hybrid automatic repeat request (HARQ) ACK/NACK transmission method and timing in the conventional FDD or FDD.

SUMMARY OF THE INVENTION

The present invention provides an acknowledgement (ACK)/not-acknowledgement (NACK) transmission method in a carrier aggregation system, and an apparatus using the method.

According to an aspect of the present invention, a method of transmitting ACK/NACK of a user equipment configured with a plurality of serving cells is provided. The method includes: receiving a cell-specific uplink (UL)-downlink (DL) configuration for a single serving cell among the plurality of serving cells, when the cell-specific UL-DL configuration is information which configures subframes in a frame of the single serving cell to a UL subframe or a DL subframe; receiving a reference UL-DL configuration for the single serving cell, when the reference UL-DL configuration is information which indicates an ACK/NACK transmission time by configuring the subframes in the frame to the UL subframe or the DL subframe; determining a valid DL subframe capable of actually receiving a data unit in the single serving cell on the basis of the cell-specific UL-DL configuration and the reference UL-DL configuration; and constructing only ACK/NACK for the valid DL subframe in a form of a bit-stream and feed-backing the bit-stream.

According to another aspect of the present invention, there is provided a user equipment including: a radio frequency (RF) unit for transmitting and receiving a radio signal; and a processor operatively coupled to the RF unit, wherein the processor is configured for: receiving a cell-specific UL-DL configuration for a single serving cell among the plurality of serving cells, when the cell-specific UL-DL configuration is information which configures subframes in a frame of the single serving cell to a UL subframe or a DL subframe; receiving a reference UL-DL configuration for the single serving cell, when the reference UL-DL configuration is information which indicates an ACK/NACK transmission time by configuring the subframes in the frame to the UL subframe or the DL subframe; determining a valid DL subframe capable of actually receiving a data unit in the single serving cell on the basis of the cell-specific UL-DL configuration and the reference UL-DL configuration; and constructing only ACK/NACK for the valid DL subframe in a form of a bit-stream and feed-backing the bit-stream.

In a carrier aggregation system in which a plurality of serving cells are configured for a user equipment, even if each serving cell uses a different uplink (UL)-downlink (DL) configuration or uses frames having different structures such as a frequency division duplex (FDD) frame/time division duplex (TDD) frame, acknowledgement (ACK)/not-acknowledgement (NACK) can be effectively transmitted.

DESCRIPTION OF EXEMPLARY EMBODIMENTS

A user equipment (UE) may be fixed or mobile, and may be referred to as another terminology, such as a mobile station (MS), a mobile terminal (MT), a user terminal (UT), a subscriber station (SS), a wireless device, a personal digital assistant (PDA), a wireless modem, a handheld device, etc.

A base station (BS) is generally a fixed station that communicates with the UE and may be referred to as another terminology, such as an evolved Node-B (eNB), a base transceiver system (BTS), an access point, etc.

A communication from the BS to the UE is called a downlink (DL), and a communication from the UE to the BS is called an uplink (UL). A wireless communication system including the BS and the UE may be a time division duplex (TDD) system or a frequency division duplex (FDD) system. The TDD system is a wireless communication system for performing UL and DL transmission/reception by using different times at the same frequency band. The FDD system is a wireless communication system capable of simultaneously performing UL and DL transmission/reception by using different frequency bands. The wireless communication system can perform communication by using a radio frame.

Figure 1:
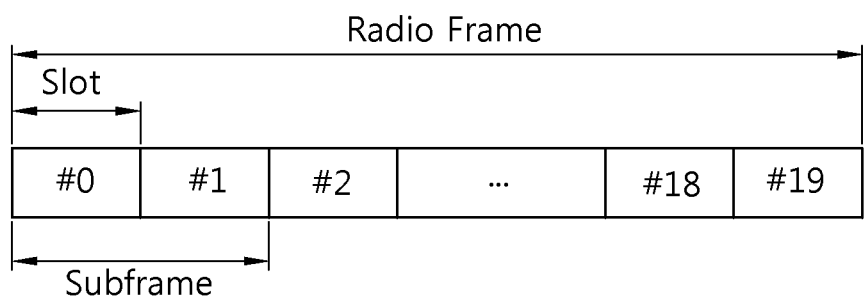
FIG. 1 shows a structure of a frequency division duplex (FDD) radio frame.

FIG. 1 shows a structure of an FDD radio frame.

The FDD radio frame (hereinafter, simply referred to as FDD frame) includes 10 subframes. One subframe includes two consecutive slots. Slots included in the radio frame are indexed from 0 to 19. A time required to transmit one subframe is defined as a transmission time interval (TTI). The TTI may be a minimum scheduling unit. For example, one subframe may have a length of 1 milliseconds (ms), and one slot may have a length of 0.5 ms.

Figure 2:
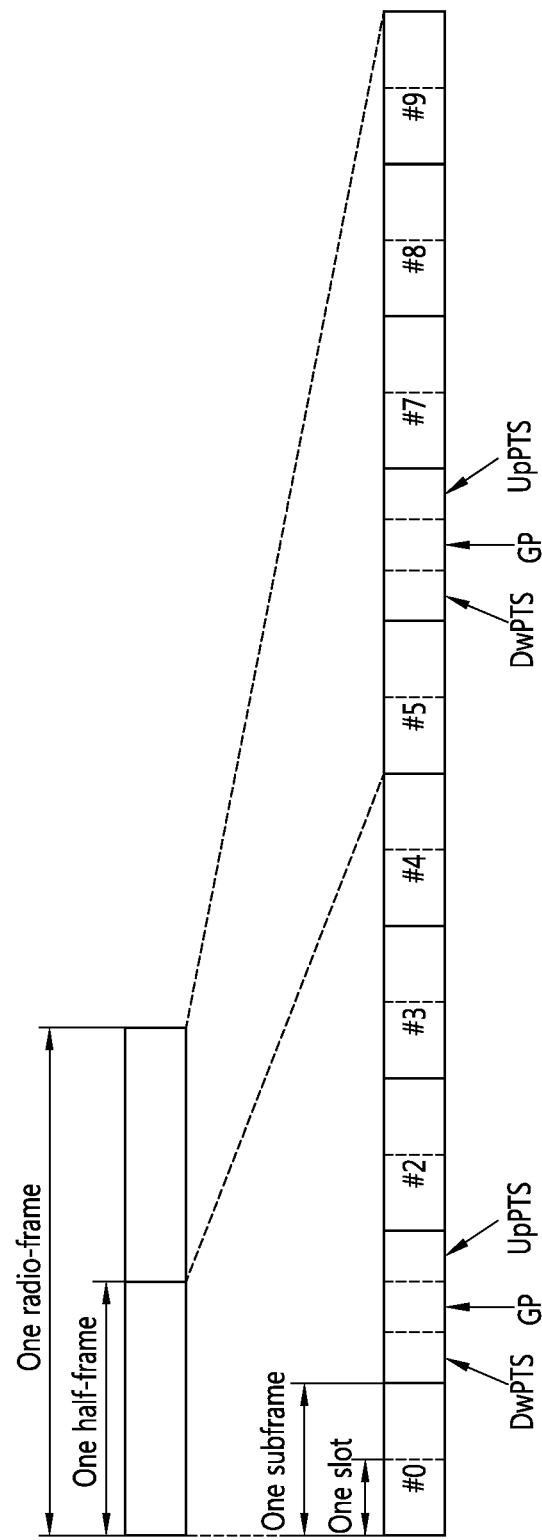
FIG. 2 shows a structure of a time division duplex (TDD) radio frame.

FIG. 2 shows a structure of a TDD radio frame.

Referring to FIG. 2, the TDD radio frame (hereinafter, TDD frame) includes 10 subframes. When subframes are indexed from 0 to 9, a subframe having an index #1 and an index #6 is called a special subframe (simply referred to as an S subframe), and includes a downlink pilot time slot (DwPTS), a guard period (GP), and an uplink pilot time slot (UpPTS). The DwPTS is used in a UE for initial cell search, synchronization, or channel estimation. The UpPTS is used in a BS for channel estimation and uplink transmission synchronization of the UE. The GP is a period for removing interference which occurs in an uplink due to a multi-path delay of a downlink signal between the uplink and a downlink.

In the TDD frame, a downlink (DL) subframe and an uplink (UL) subframe coexist. Table 1 below shows an example of a UL-DL configuration of a radio frame.

TABLE 1

| Uplink-downlink configuration | Downlink-to-Uplink Switch-point periodicity | Subframe n | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1 above, 'D' denotes a DL subframe, 'U' denotes a UL subframe, and 'S' denotes a special subframe. Upon receiving the UL-DL configuration from the BS, the UE can know whether each subframe is a DL subframe or a UL subframe in the TDD subframe. Hereinafter, a UL-DL configuration N (where N is any one value from 0 to 6) may use Table 1 above by reference.

Meanwhile, the special subframe may be any one of configurations shown in the following table.

TABLE 2

| Special subframe configuration | Normal CP (downlink) | | | Extended CP(downlink) | | |
|---|---|---|---|---|---|---|
| | | UpPTS | | | UpPTS | |
| | DwPTS | Normal CP (uplink) | Extended CP (uplink) | DwPTS | Normal CP (uplink) | Extended CP (uplink) |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

In Table 2, $T_s$ has a relation of: $307200T_s=10$ ms (millisecond).

Figure 3:
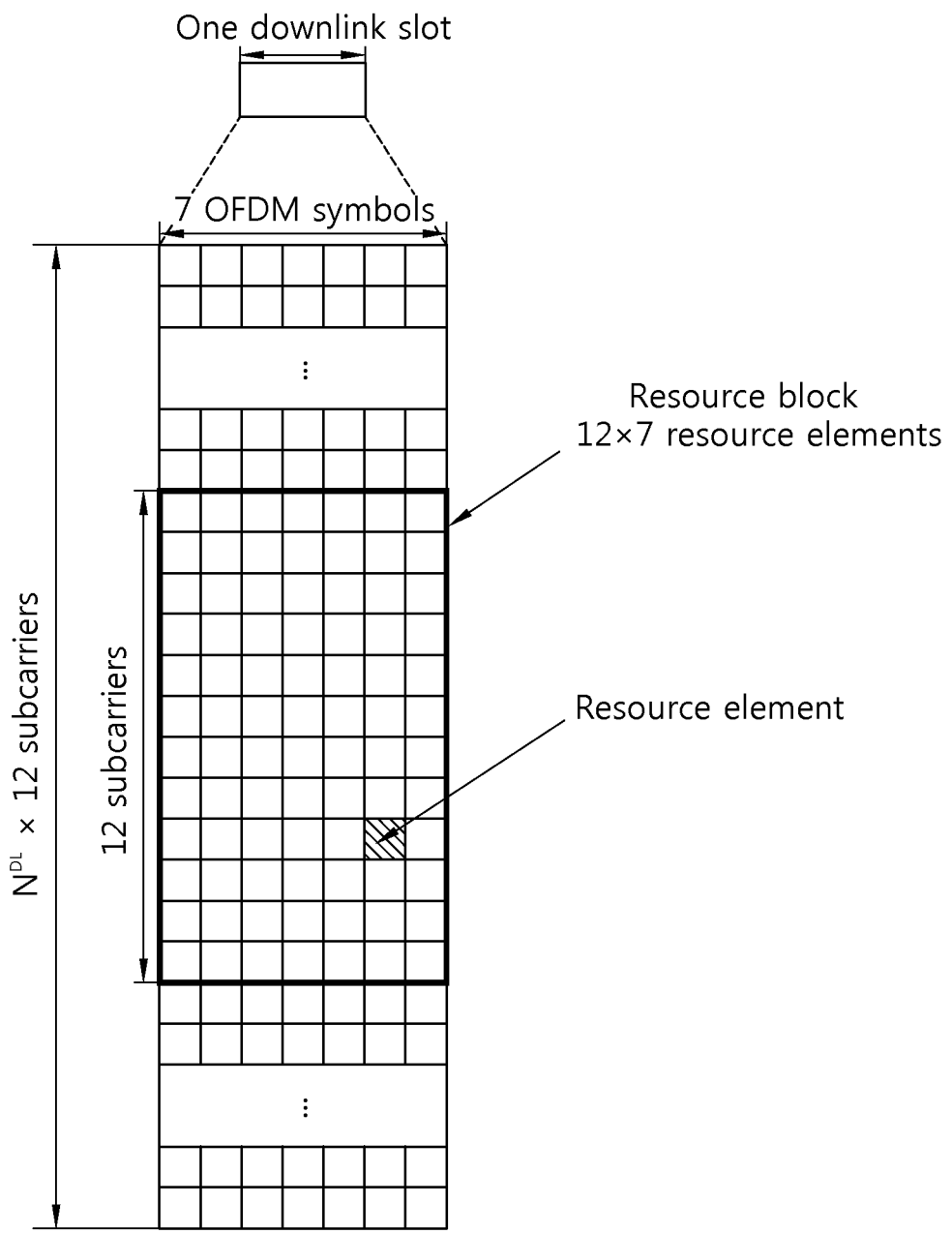
FIG. 3 shows an example of a resource grid for one downlink (DL) slot.

FIG. 3 shows an example of a resource grid for one DL slot.

Referring to FIG. 3, the DL slot includes a plurality of orthogonal frequency division multiplexing (OFDM) symbols in a time domain, and includes $N_{RB}$ resource blocks (RBs) in a frequency domain. The RB is a resource allocation unit, and includes one slot in the time domain and includes a plurality of subcarriers in the frequency domain. The number $N_{RB}$ of RBs included in the DL slot depends on a DL transmission bandwidth configured in a cell. For example, in the LTE system, $N_{RB}$ may be any one value in the range of 6 to 110. A structure of a UL slot may be the same as the aforementioned structure of the DL slot.

Each element on the resource grid is referred to as a resource element (RE). The RE on the resource grid can be identified by an index pair (k,l) within the slot. Herein, k (k=0, . . . , $N_{RB} \times 12-1$) denotes a subcarrier index in the frequency domain, and l (l=0, . . . , 6) denotes an OFDM symbol index in the time domain.

Although it is described in FIG. 3 that one RB includes 7×12 REs consisting of 7 OFDM symbols in the time domain and 12 subcarriers in the frequency domain for example, the number of OFDM symbols and the number of subcarriers in the RB are not limited thereto. The number of OFDM symbols and the number of subcarriers may change variously depending on a cyclic prefix (CP) length, a frequency spacing, etc. The number of subcarriers in one OFDM symbol may be selected from 128, 256, 512, 1024, 1536, and 2048.

Figure 4:
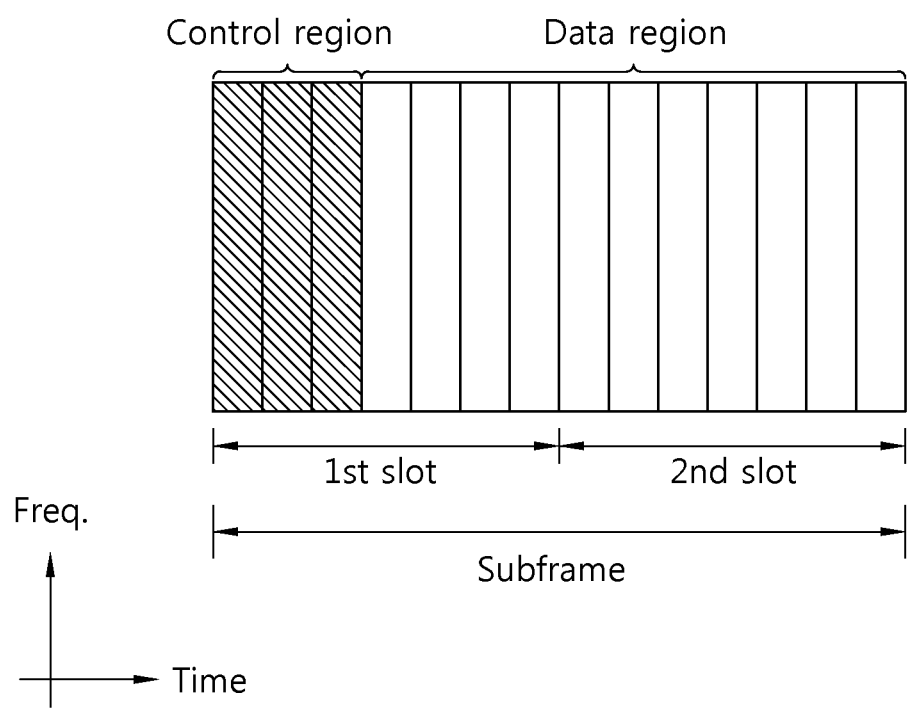
FIG. 4 shows a structure of a DL subframe.

FIG. 4 shows a structure of a DL subframe.

Referring to FIG. 4, the DL subframe is divided into a control region and a data region in the time domain. The control region includes up to first three (optionally, up to four) OFDM symbols of a $1^{st}$ slot in the subframe. However, the number of OFDM symbols included in the control region may vary. A physical downlink control channel (PDCCH) is allocated to the control region, and a physical downlink shared channel (PDSCH) is allocated to the data region.

As disclosed in 3GPP TS 36.211 V8.7.0, the 3GPP LTE classifies a physical channel into a data channel and a control channel. Examples of the data channel include a physical downlink shared channel (PDSCH) and a physical uplink shared channel (PUSCH). Examples of the control channel include a physical downlink control channel (PDCCH), a physical control format indicator channel (PCFICH), a physical hybrid-ARQ indicator channel (PHICH), and a physical uplink control channel (PUCCH).

A physical control format indicator channel (PCFICH) transmitted in a $1^{st}$ OFDM symbol of the subframe carries a control format indicator (CFI) regarding the number of OFDM symbols (i.e., a size of the control region) used for transmission of control channels in the subframe. The UE first receives the CFI on the PCFICH, and thereafter monitors the PDCCH. Unlike the PDCCH, the PCFICH does not use blind decoding, and is transmitted by using a fixed PCFICH resource of the subframe.

A physical hybrid-ARQ indicator channel (PHICH) carries a positive-acknowledgement (ACK)/negative-acknowledgement (NACK) signal for an uplink hybrid automatic repeat request (HARQ). The ACK/NACK signal for UL data on a PUSCH transmitted by the UE is transmitted on the PHICH.

A physical broadcast channel (PBCH) is transmitted in first four OFDM symbols in a $2^{nd}$ slot of a $1^{st}$ subframe of a radio frame. The PBCH carries system information necessary for communication between the UE and a BS. The system information transmitted through the PBCH is referred to as a master information block (MIB). In comparison thereto, system information transmitted on the PDCCH is referred to as a system information block (SIB).

Control information transmitted through the PDCCH is referred to as downlink control information (DCI). The DCI may include resource allocation of the PDSCH (this is referred to as a DL grant), resource allocation of a PUSCH (this is referred to as a UL grant), a set of transmit power control commands for individual UEs in any UE group, and/or activation of a voice over Internet protocol (VoIP).

Figure 5:
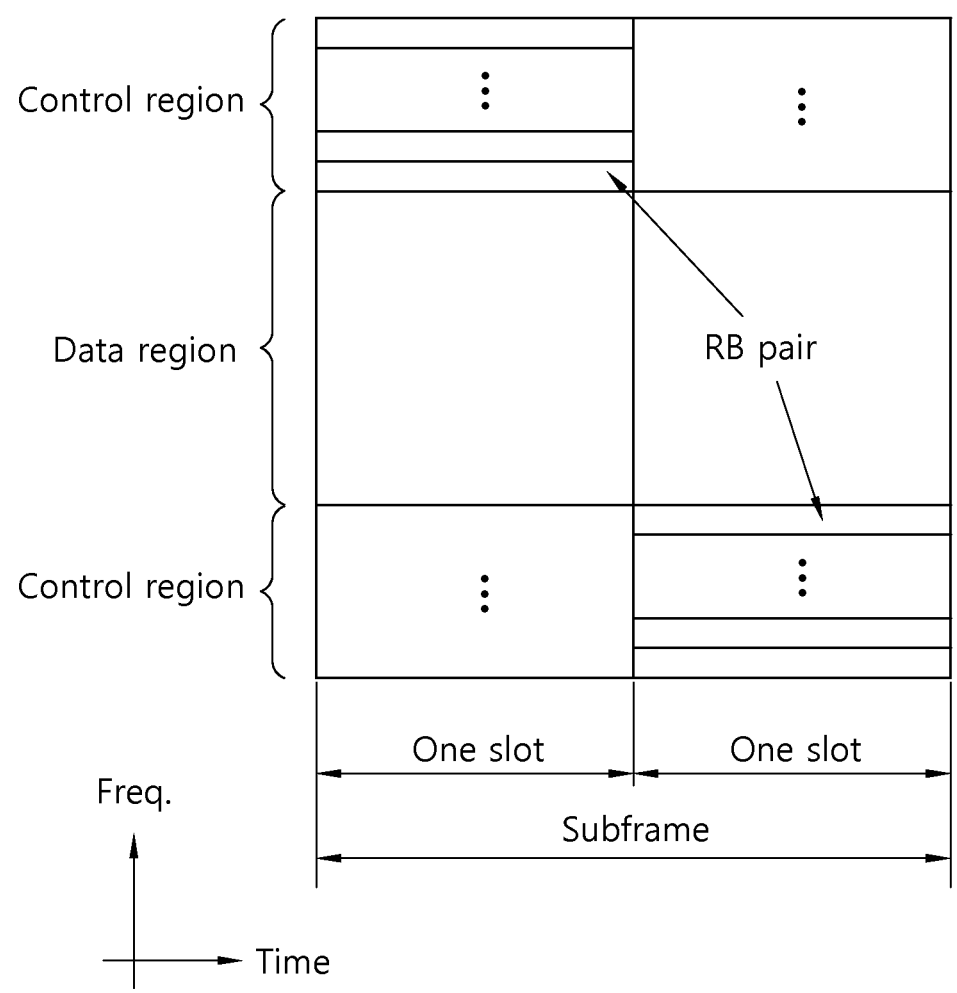
FIG. 5 shows a structure of an uplink (UL) subframe.

FIG. 5 shows a structure of a UL subframe.

Referring to FIG. 5, the UL subframe may be divided into a control region and a data region in a frequency domain. The control region is a region to which a physical uplink control channel (PUCCH) carrying UL control information is allocated. The data region is a region to which a physical uplink shared channel (PUSCH) carrying user data is allocated.

The PUCCH is allocated in an RB pair in a subframe. RBs belonging to the RB pair occupy different subcarriers in each of a $1^{st}$ slot and a $2^{nd}$ slot. The RB pair has the same RB index m.

Meanwhile, the PUCCH supports multiple formats. A PUCCH having a different number of bits per subframe may be used according to a modulation scheme which is dependent on the PUCCH format.

Table 3 below shows an example of a modulation scheme and the number of bits per subframe according to the PUCCH format.

TABLE 3

| PUCCH format | Modulation scheme | Number of bits per sub frame |
| --- | --- | --- |
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + QPSK | 22 |

The PUCCH format 1 is used for transmission of a scheduling request (SR). The PUCCH formats 1a/1b are used for transmission of an ACK/NACK signal. The PUCCH format 2 is used for transmission of a CQI. The PUCCH formats 2a/2b are used for simultaneous transmission of the CQI and the ACK/NACK signal. When only the ACK/NACK signal is transmitted in a subframe, the PUCCH formats 1a/1b are used. When the SR is transmitted alone, the PUCCH format 1 is used. When the SR and the ACK/NACK are simultaneously transmitted, the PUCCH format 1 is used, and in this case, the ACK/NACK signal is modulated by using a resource allocated to the SR.

All PUCCH formats use a cyclic shift (CS) of a sequence in each OFDM symbol. The cyclically shifted sequence is generated by cyclically shifting a base sequence by a specific CS amount. The specific CS amount is indicated by a CS index.

An example of a base sequence $r_u(n)$ is defined by the following equation.

$$r_u(n) = e^{jb(n)\pi/4} \qquad \text{[Equation 1]}$$

Herein, u denotes a root index, and n denotes a component index in the range of $0 \leq n \leq N-1$, where N is a length of the base sequence. b(n) is defined in the section 5.5 of 3GPP TS 36.211 V8.7.0.

A length of a sequence is equal to the number of elements included in the sequence. u can be determined by a cell identifier (ID), a slot number in a radio frame, etc. When it is assumed that the base sequence is mapped to one RB in a frequency domain, the length N of the base sequence is 12 since one RB includes 12 subcarriers. A different base sequence is defined according to a different root index.

The base sequence r(n) can be cyclically shifted by Equation 2 below to generate a cyclically shifted sequence r(n, $I_{cs}$).

$$r(n, I_{cs}) = r(n) \cdot \exp\left(\frac{j2\pi I_{cs}n}{N}\right),$$ [Equation 2]

$$0 \leq I_{cs} \leq N-1$$

Herein, $I_{cs}$ denotes a CS index indicating a CS amount ($0 \leq I_{cs} \leq N-1$).

Hereinafter, the available CS of the base sequence denotes a CS index that can be derived from the base sequence according to a CS interval. For example, if the base sequence has a length of 12 and the CS interval is 1, the total number of available CS indices of the base sequence is 12. Alternatively, if the base sequence has a length of 12 and the CS interval is 2, the total number of available CS indices of the base sequence is 6.

Figure 6:
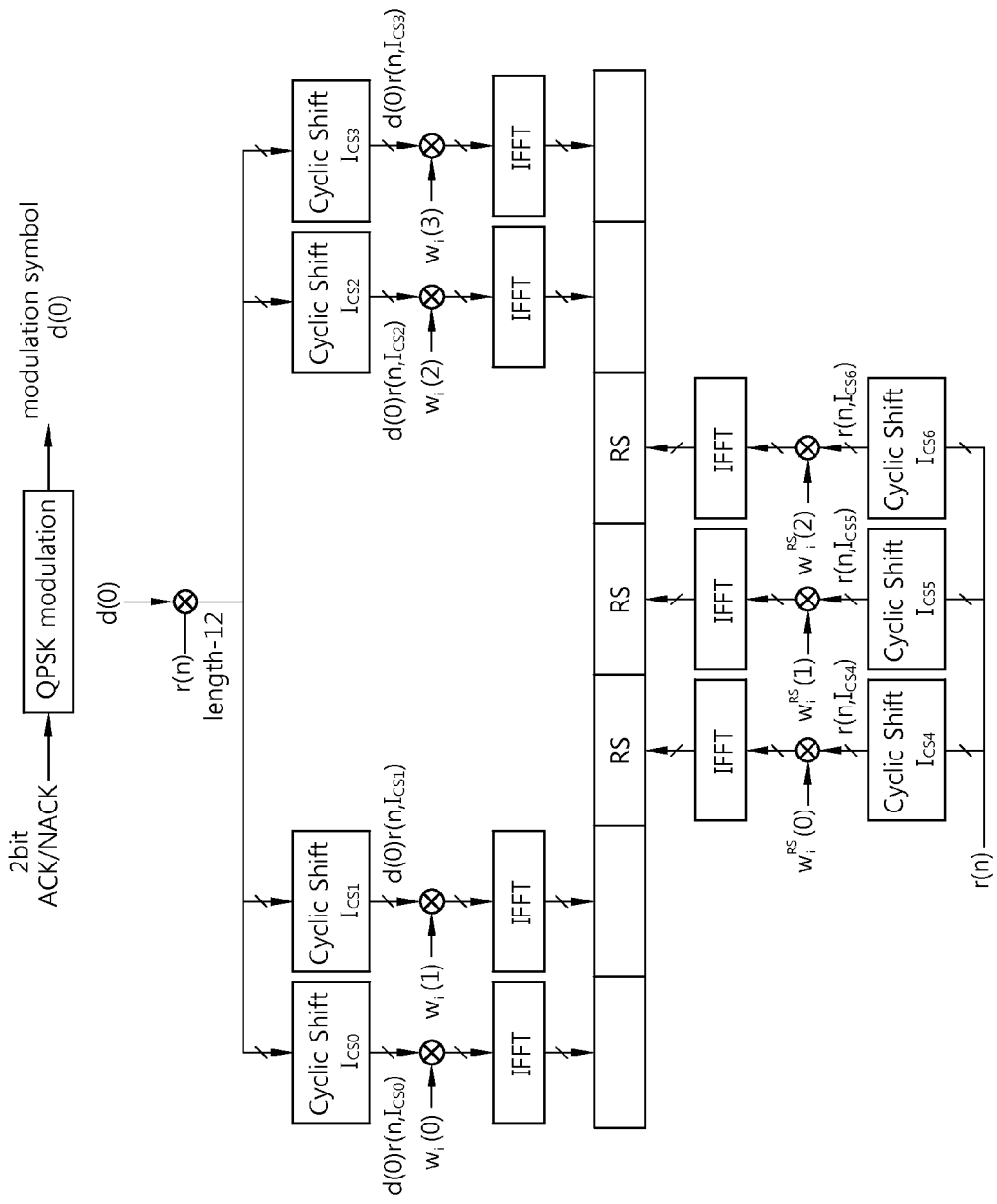
FIG. 6 shows a channel structure of a physical uplink control channel (PUCCH) format 1b in a normal cyclic prefix (CP) case.

FIG. 6 shows a channel structure of a PUCCH format 1b in a normal CP case.

One slot includes 7 OFDM symbols. Three OFDM symbols are reference signal (RS) OFDM symbols for an RS. Four OFDM symbols are data symbols for an ACK/NACK signal.

In the PUCCH format 1b, a modulation symbol d(0) is generated by modulating a 2-bit ACK/NACK signal based on quadrature phase shift keying (QPSK).

A CS index $I_{cs}$ may vary depending on a slot number $n_s$ in a radio frame and/or a symbol index 1 in a slot.

In the normal CP case, there are four data OFDM symbols for transmission of an ACK/NACK signal in one slot. Therefore, assume that CS indices corresponding to the respective data OFDM symbols are denoted by $I_{cs0}$, $I_{cs1}$, $I_{cs2}$, and $I_{cs3}$.

The modulation symbol d(0) is spread to a cyclically shifted sequence r(n,$I_{cs}$). When a one-dimensional spreading sequence corresponding to an $(i+1)^{th}$ OFDM symbol in a subframe is denoted by m(i), it can be expressed as follows.

{m(0), m(1), m(2), m(3)}={d(0)r(n,$I_{cs0}$), d(0)r(n,$I_{cs1}$), d(0)r(n,$I_{cs2}$), d(0)r(n,$I_{cs3}$)}

In order to increase UE capacity, the one-dimensional spreading sequence can be spread by using an orthogonal sequence. An orthogonal sequence $w_i(k)$ (where i is a sequence index, $0 \leq k \leq K-1$) having a spread factor K=4 uses the following sequence.

TABLE 4

| Index (i) | [$w_i(0)$, $w_i(1)$, $w_i(2)$, $w_i(3)$] |
|---|---|
| 0 | [+1, +1, +1, +1] |
| 1 | [+1, −1, +1, −1] |
| 2 | [+1, −1, −1, +1] |

An orthogonal sequence $w_i(k)$ (where i is a sequence index, $0 \leq k \leq K-1$) having a spread factor K=3 uses the following sequence.

TABLE 5

| Index (i) | [$w_i(0)$, $w_i(1)$, $w_i(2)$] |
|---|---|
| 0 | [+1, +1, +1] |
| 1 | [+1, $e^{j2\pi/3}$, $e^{j4\pi/3}$] |
| 2 | [+1, $e^{j4\pi/3}$, $e^{j2\pi/3}$] |

A different spread factor can be used for each slot.

Therefore, when any orthogonal sequence index i is given, two-dimensional spreading sequences {s(0), s(1), s(2), s(3)} can be expressed as follows.

{s(0), s(1), s(2), s(3)}={$w_i(0)$m(0), $w_i(1)$m(1), $w_i(2)$m(2), $w_i(3)$m(3)}

The two-dimensional spreading sequences {s(0), s(1), s(2), s(3)} are subjected to inverse fast Fourier transform (IFFT) and thereafter are transmitted in corresponding OFDM symbols. Accordingly, an ACK/NACK signal is transmitted on a PUCCH.

A reference signal of the PUCCH format 1b is also transmitted by cyclically shifting the base sequence r(n) and then by spreading it by the use of an orthogonal sequence. When CS indices corresponding to three RS OFDM symbols are denoted by $I_{cs4}$, $I_{cs5}$, and $I_{cs6}$, three cyclically shifted sequences r(n,$I_{cs4}$), r(n,$I_{cs5}$), and r(n,$I_{cs6}$) can be obtained. The three cyclically shifted sequences are spread by the use of an orthogonal sequence $w^{RS}_i(k)$ having a spreading factor K=3.

An orthogonal sequence index i, a CS index $I_{cs}$, and a resource block index m are parameters required to construct the PUCCH, and are also resources used to identify the PUCCH (or UE). If the number of available cyclic shifts is 12 and the number of available orthogonal sequence indices is 3, PUCCHs for 36 UEs in total can be multiplexed to one resource block.

In the 3GPP LTE, a resource index $n^{(1)}_{PUCCH}$ is defined in order for the UE to obtain the three parameters for constructing the PUCCH. The resource index $n^{(1)}_{PUCCH}$ is defined to $n_{CCE}+n^{(1)}_{PUCCH}$, where $n_{CCE}$ is an index of a first CCE used for transmission of a corresponding DCI (i.e., a DL resource allocation used to receive DL data corresponding to an ACK/NACK signal), and $n^{(1)}_{PUCCH}$ is a parameter reported by a BS to the UE by using a higher-layer message.

Time, frequency, and code resources used for transmission of the ACK/NACK signal are referred to as ACK/NACK resources or PUCCH resources. As described above, an index of a PUCCH resource or the ACK/NACK resource required to transmit the ACK/NACK signal on the PUCCH can be expressed with at least any one of an orthogonal sequence index i, a CS index $I_{cs}$, a resource block index m, and a PUCCH index $n^{(1)}_{PUCCH}$ for obtaining the three indices. The ACK/NACK resource may include at least any one of an orthogonal sequence, a cyclic shift, a resource block, and a combination thereof.

Figure 7:
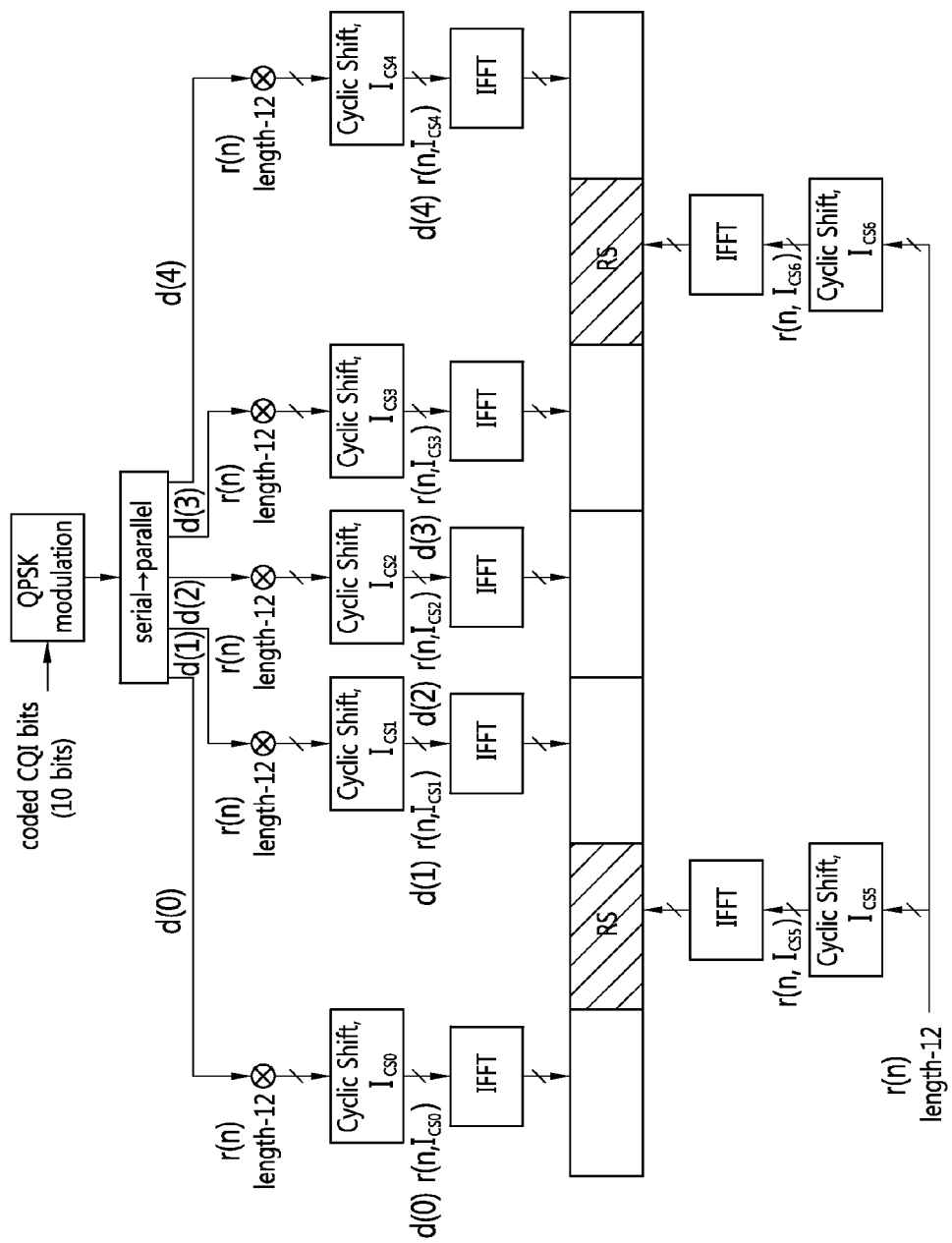
FIG. 7 shows a channel structure of PUCCH formats 2/2a/2b in a normal CP case.

FIG. 7 shows a channel structure of PUCCH formats 2/2a/2b in a normal CP case.

Referring to FIG. 7, in the normal CP case, OFDM symbols 1 and 5 (i.e., $2^{nd}$ and $6^{th}$ OFDM symbols) are used for a demodulation reference signal (DM RS) which is an uplink reference signal, and the remaining OFDM symbols are used for CQI transmission. In an extended CP case, an OFDM symbol 3 (i.e., a $4^{th}$ OFDM symbol) is used for a DM RS.

10 CQI information bits are channel coded, for example, with a coding rate of 1/2, to generate 20 coded bits. A Reed-Muller code can be used in the channel coding. After scheduling, QPSK constellation mapping is performed to generate QPSK modulation symbols (e.g., d(0) to d(4) in a slot 0). Each QPSK modulation symbol is subjected to IFFT after being modulated by using a cyclic shift of a base RS sequence having a length of 12, and is then transmitted in each of 10 SC-FDMA symbols in a subframe. 12 equally-spaced cyclic shifts allow 12 different UEs to be orthogonally multiplexed on the same PUCCH RB. A DM RS sequence applied to the ODMA symbols 1 and 5 may be the base RS sequence having the length of 12.

Figure 8:
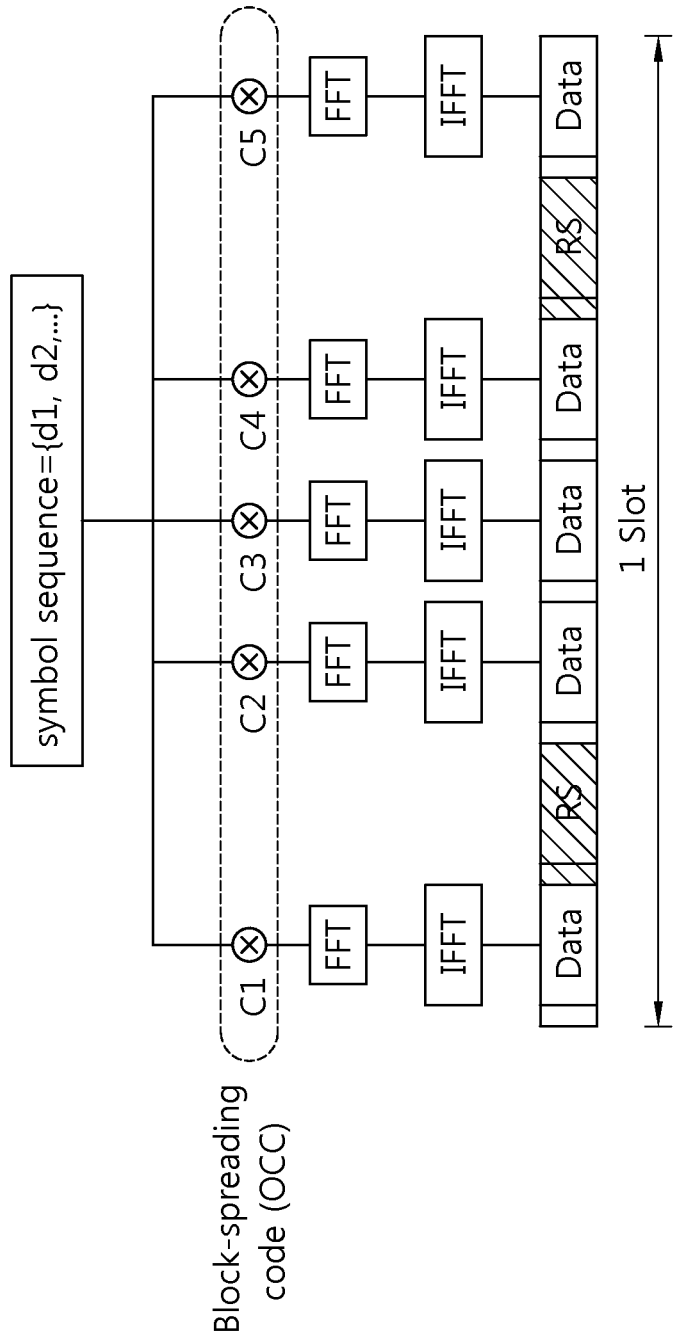
FIG. 8 shows a PUCCH format 3 based on block spreading.

FIG. 8 shows a PUCCH format 3 based on block spreading.

Referring to FIG. 8, the PUCCH format 3 is a PUCCH format which uses a block spreading method. The block spreading method is a method of multiplexing a modulation symbol sequence modulated from multi-bit ACK/NACK by using a block spreading code. The block spreading method may use an SC-FDMA scheme. Herein, the SC-FDMA scheme is a scheme in which IFFT is performed after DFT spreading (or FFT).

The PUCCH format 3 is used when a symbol sequence (e.g., an ACK/NACK symbol sequence) is transmitted in a spreading manner in a time domain by the use of a block spreading code. An orthogonal cover code (OCC) may be used as the block spreading code. Control signals of several UEs may be multiplexed by the block spreading code. In the PUCCH format 2, one symbol sequence is transmitted in an overlapping manner in the time domain, and UE multiplexing is performed using cyclic shift of a constant amplitude zero auto-correlation (CAZAC) sequence, whereas in the PUCCH format 3, a symbol sequence (indicated by {d1, d2, . . . }) consisting of one or more symbols is transmitted across a frequency domain of each data symbol (i.e., a symbol indicated by Data), and UE multiplexing is performed by spreading it in the time domain by the use of a block spreading code (indicated by C1, C2, C3, C4, C5). Although a case where two RS symbols (i.e., symbols indicated by RS) are used in one slot is shown in FIG. 8, the present invention is not limited thereto, and thus an OCC having a spreading factor of 4 may be used. An RS symbol may be generated from a CAZAC sequence having a specific cyclic shift, and may be transmitted in a format in which a specific OCC is multiplied to a plurality of RS symbols of the time domain.

Now, ACK/NACK transmission for HARQ in 3GPP LTE time division duplex (TDD) is described.

As described in a TDD frame, a DL subframe and a UL subframe coexist in the TDD frame. In general, the number of UL subframes is less than the number of DL subframes. Therefore, in preparation for a case where the UL subframes for transmitting an ACK/NACK signal are insufficient, it is supported that a plurality of ACK/NACK signals for a plurality of DL transport blocks received in a plurality of DL subframes are transmitted in one UL subframe.

According to the section 10.1 of 3GPP TS 36.213 V8.7.0 (2009-05), two ACK/NACK modes, i.e., ACK/NACK bundling and ACK/NACK multiplexing, are introduced.

The ACK/NACK bundling is an operation in which, if all of PDSCHs (i.e., DL transport blocks) received by a UE are successfully decoded, ACK is transmitted, and otherwise NACK is transmitted. For this, ACK or NACK for each PDSCH is compressed using an AND operation (i.e., a logical AND operation).

ACK/NACK multiplexing is also called ACK/NACK channel selection (or simply channel selection). When the ACK/NACK multiplexing is used, the UE transmits ACK/NACK by selecting one PUCCH resource among a plurality of PUCCH resources.

The following table shows a DL subframe n−k associated with a UL subframe n depending on the UL-DL configuration in 3GPP LTE. Herein, k∈K, and M is the number of elements of a set K.

TABLE 6

| UL-DL Configu-ration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

Assume that M DL subframes are associated with a UL subframe n, where M=3 for example. Since 3 PDCCHs can be received from 3 DL subframes, the UE can acquire 3 PUCCH resources $n^{(1)}_{PUCCH,0}$, $n^{(1)}_{PUCCH,1}$, $n^{(1)}_{PUCCH,2}$, $n^{(1)}_{PUCCH,3}$. In this case, an example of ACK/NACK channel selection is shown in the following table.

TABLE 7

| HARQ-ACK(0), HARQ-ACK(1), HARQ-ACK(2) | $n^{(1)}_{PUCCH}$ | b(0), b(1) |
|---|---|---|
| ACK, ACK, ACK | $n^{(1)}_{PUCCH, 2}$ | 1, 1 |
| ACK, ACK, NACK/DTX | $n^{(1)}_{PUCCH, 1}$ | 1, 1 |
| ACK, NACK/DTX, ACK | $n^{(1)}_{PUCCH, 0}$ | 1, 1 |
| ACK, NACK/DTX, NACK/DTX | $n^{(1)}_{PUCCH, 0}$ | 0, 1 |
| NACK/DTX, ACK, ACK | $n^{(1)}_{PUCCH, 2}$ | 1, 0 |
| NACK/DTX, ACK, NACK/DTX | $n^{(1)}_{PUCCH, 1}$ | 0, 0 |
| NACK/DTX, NACK/DTX, ACK | $n^{(1)}_{PUCCH, 2}$ | 0, 0 |
| DTX, DTX, NACK | $n^{(1)}_{PUCCH, 2}$ | 0, 1 |
| DTX, NACK, NACK/DTX | $n^{(1)}_{PUCCH, 1}$ | 1, 0 |
| NACK, NACK/DTX, NACK/DTX | $n^{(1)}_{PUCCH, 0}$ | 1, 0 |
| DTX, DTX, DTX | N/A | N/A |

In the above table, HARQ-ACK(i) denotes ACK/NACK for an $i^{th}$ DL subframe among the M DL subframes. Discontinuous transmission (DTX) implies that a DL transport block cannot be received on a PDSCH in a corresponding DL subframe or a corresponding PDCCH cannot be detected. In Table 7 above, there are three PUCCH resources $n^{(1)}_{PUCCH,0}$, $n^{(1)}_{PUCCH,1}$, and $n^{(1)}_{PUCCH,2}$, and b(0) and b(1) are 2 bits transmitted by using a selected PUCCH.

For example, if the UE successfully receives three DL transport blocks in three DL subframes, the UE transmits bits (1,1) through the PUCCH by performing QPSK modulation using $n^{(1)}_{PUCCH,2}$. If the UE fails to decode the DL transport block and successfully decodes the remaining transport blocks in a $1^{st}$ (i=0) DL subframe, the UE transmits bits (0, 1) through the PUCCH using $n^{(1)}_{PUCCH,2}$. That is, the conventional PUCCH format 1b can transmit only 2-bit ACK/NACK. However, channel selection is used to express more ACK/NACK states, by linking the allocated PUCCH resources and an actual ACK/NACK signal.

In ACK/NACK channel selection, NACK and DTX are coupled if at least one ACK exists. This is because a combination of a reserved PUCCH resource and a QPSK symbol is not enough to express all ACK/NACK states. However, if the ACK does not exist, the DTX and the NACK are decoupled.

In the aforementioned ACK/NACK bundling or channel selection, the total number of PDSCHs for which ACK/NACK is transmitted by the UE is important. If the UE fails to receive some of the plurality of PDCCHs for scheduling a plurality of PDSCHs, an error occurs in the total number of PDSCHs for which the ACK/NACK is transmitted, and thus ACK/NACK may be transmitted erroneously. To correct this error, a TDD system transmits the PDCCH by including a downlink assignment index (DAI). The DAI reports a counting value by counting the number of PDCCHs for scheduling the PDSCHs.

The aforementioned ACK/NACK bundling and ACK/NACK multiplexing may be applied when one serving cell is configured for the UE in TDD.

For example, it is assumed that one serving cell is configured (i.e., only a primary cell is configured) to the UE in TDD, ACK/NACK bundling or ACK/NACK multiplexing is used, and M=1. That is, it is assumed a case where one DL subframe is associated with one UL subframe.

1) In a case where the UE detects a PDSCH indicated by a corresponding PDCCH or a semi-persistent scheduling (SPS) release PDCCH in a subframe n−k of the primary cell, ACK/NACK is transmitted in a subframe n. In LTE, a BS may report to the UE about at which subframes semi-persistent transmission/reception is performed, by using a higher layer signal such as radio resource control (RRC). For example, a parameter given by the higher layer signal may be a subframe period and an offer value. The UE recognizes semi-persistent transmission through RRC signaling, and thereafter upon receiving an activation/release signal of SPS transmission through a PDCCH, performs or releases SPS PDSCH reception or SPS PUSCH transmission. That is, even if the UE is subjected to SPS scheduling through RRC signaling, if SPS transmission/reception is not immediately performed but an activation or release signal is received through a PDCCH, the SPS transmission/reception is performed in a subframe corresponding to a subframe period and an offset value allocated through RRC signaling by applying a frequency resource (i.e., a resource block) based on resource allocation designated in the PDCCH and a modulation and coding rate based on MCS information. In this case, a PDCCH for releasing SPS is called an SPS release PDCCH. In an LTE system, a DL SPS release PDCCH requires ACK/NACK signal transmission.

In this case, the UE transmits ACK/NACK in the subframe n by using the PUCCH formats 1a/1b based on the PUCCH resource $n^{(1,\tilde{p})}_{PUCCH}$. In $n^{(1,\tilde{p})}_{PUCCH}$, p indicates that it belongs to an antenna port p. k is determined by Table 6 above.

The PUCCH resource $n^{(1,\tilde{p})}_{PUCCH}$ may be allocated as follows. p may be p0 or p1.

$$n^{(1,\tilde{p}=p0)}_{PUCCH} = (M-m-1) \cdot N_c + m \cdot N_{c+1} + n_{CCE} + N^{(1)}_{PUCCH} \text{ for antenna port } p=p0$$

$$n^{(1,\tilde{p}=p1)}_{PUCCH} = (M-m-1) \cdot N_c + m \cdot N_{c+1} + (n_{CCE}+1) + N^{(1)}_{PUCCH} \text{ for antenna port } p=p1 \quad \text{[Equation 3]}$$

In Equation 3, c is selected from {0,1,2,3} to satisfy $N_c \le n_{CCE} < N_{c+1}$ (antenna port p0), $N_c \le (n_{CCE}+1) < N_{c+1}$ (antenna port p1). $N^{(1)}_{PUCCH}$ is a value determined by a higher layer signal. $N_C$ may be set to $N_C = \max\{0, \text{floor }[N^{DL}_{RB} \cdot (N^{RB}_{sc} \cdot c - 4)/36]\}$. $N^{DL}_{RB}$ is a DL bandwidth. $N^{RB}_{sc}$ is a size in a frequency domain of a resource block, and is indicated by the number of subcarriers. $n_{CCE}$ is a first CCE number used in transmission of a corresponding PDCCH in a subframe n−k$_m$. m is a value which allows k$_m$ to be a smallest value in the set K of Table 6 above.

2) If the UE detects an SPS PDSCH, that is, a PDSCH not having a corresponding PDCCH, in a DL subframe n−k of the primary cell, then ACK/NACK can be transmitted in a subframe n by using a PUCCH resource $n^{(1,\tilde{p})}_{PUCCH}$ as described below.

Since the SPS PDSCH does not have a PDCCH for scheduling, the UE transmits ACK/NACK through the PUCCH formats 1a/1b based on $n^{(1,\tilde{p})}_{PUCCH}$ determined by a higher layer signal. For example, four resources (i.e., a 1$^{st}$ PUCCH resource, a 2$^{nd}$ PUCCH resource, a 3$^{rd}$ PUCCH resource, and a 4$^{th}$ PUCCH resource) can be reserved by using an RRC signal, and one resource can be indicated by using a transmission power control (TPC) field of a PDCCH for activating SPS scheduling.

The following table shows an example of indicating a resource for channel selection according to the TPC field value.

TABLE 8

| TPC field value | Resource for channel selection |
| --- | --- |
| '00' | 1$^{st}$ PUCCH resource |
| '01' | 2$^{nd}$ PUCCH resource |
| '10' | 3$^{rd}$ PUCCH resource |
| '11' | 4$^{th}$ PUCCH resource |

For another example, it is assumed that one serving cell is configured (that is, only a primary cell is configured) for the UE in TDD, ACK/NACK multiplexing is used, and M>1. That is, it is assumed that a plurality of DL subframes is associated with one UL subframe.

1) If the UE receives a PDSCH in a subframe n−k$_i$ (0≤i≤M−1) or detects a DL SPS release PDCCH, a PUCCH resource $n^{(1)}_{PUCCH,i}$ for transmitting ACK/NACK may be allocated by the following equation. Herein, k$_i \in$ K, and the set K is described above with reference to Table 6.

$$n^{(1)}_{PUCCH,i} = (M-i-1) \cdot N_c + i \cdot N_{c+1} + n_{CCE,i} + N^{(1)}_{PUCCH} \quad \text{[Equation 4]}$$

Herein, c is selected from {0,1,2,3} to satisfy $N_c \le n_{CCE,m} < N_{c+1}$. $N^{(1)}_{PUCCH}$ is a value determined by using a higher layer signal. $N_C$ may be max{0, floor $[N^{DL}_{RB} \cdot (N^{RB}_{sc} \cdot c - 4)/36]$}. $N^{DL}_{RB}$ is a downlink bandwidth, and $N^{RB}_{sc}$ is a size of a resource block indicated with the number of subcarriers in the frequency domain. $n_{CCE,m}$ is a 1$^{st}$ CCE number used in transmission of a corresponding PDCCH at a subframe n−k$_m$.

2) If the UE receives a PDSCH not having a corresponding PDCCH (i.e., an SPS PDSCH) in the subframe n−k$_i$, $n^{(1)}_{PUCCH,i}$ is determined according to a configuration given by a higher layer signal and according to Table 8.

If two or more serving cells are configured for the UE in TDD, the UE transmits ACK/NACK by using channel selection based on the PUCCH format 1b or by using the PUCCH format 3.

For example, in a case where a plurality of serving cells which use channel selection based on the PUCCH format 1b are configured, if an ACK/NACK bit is greater than 4 bits, the UE performs spatial ACK/NACK bundling for a plurality of codewords in one DL subframe, and transmits the bundled ACK/NACK bit for each serving cell through the channel selection based on the PUCCH format 1b. The spatial ACK/NACK bundling implies that ACK/NACK for each codeword is compressed through a logical AND operation in the same DL subframe.

If the ACK/NACK bit is less than or equal to 4 bits, the spatial ACK/NACK bundling is not used, and transmission is performed through the channel selection based on the PUCCH format 1b.

For another example, in a case where two or more serving cells using the PUCCH format 3 are configured for the UE, if the ACK/NACK bit is greater than 20 bits, the spatial ACK/NACK bundling is performed in each serving cell, and the ACK/NACK bit which is subjected to the spatial ACK/NACK bundling may be transmitted using the PUCCH format 3. If the ACK/NACK bit is less than or equal to 20 bits, the spatial ACK/NACK bundling is not used, and the ACK/NACK bit is transmitted using the PUCCH format 3.

Now, a carrier aggregation system will be described. The carrier aggregation system is also called a multiple carrier system.

A 3GPP LTE system supports a case where a DL bandwidth and a UL bandwidth are differently configured under the premise that one component carrier (CC) is used. The 3GPP LTE system supports up to 20 MHz, and the UL bandwidth and the DL bandwidth may be different from each other. However, only one CC is supported in each of UL and DL cases.

Spectrum aggregation (also referred to as bandwidth aggregation or carrier aggregation) supports a plurality of CCs. For example, if 5 CCs are assigned as a granularity of a carrier unit having a bandwidth of 20 MHz, a bandwidth of up to 100 MHz can be supported.

One DL CC or a pair of a UL CC and a DL CC can correspond to one cell. Therefore, when a UE communicates with a BS through a plurality of DL CCs, it can be said that the UE receives a service from a plurality of serving cells.

Figure 9:
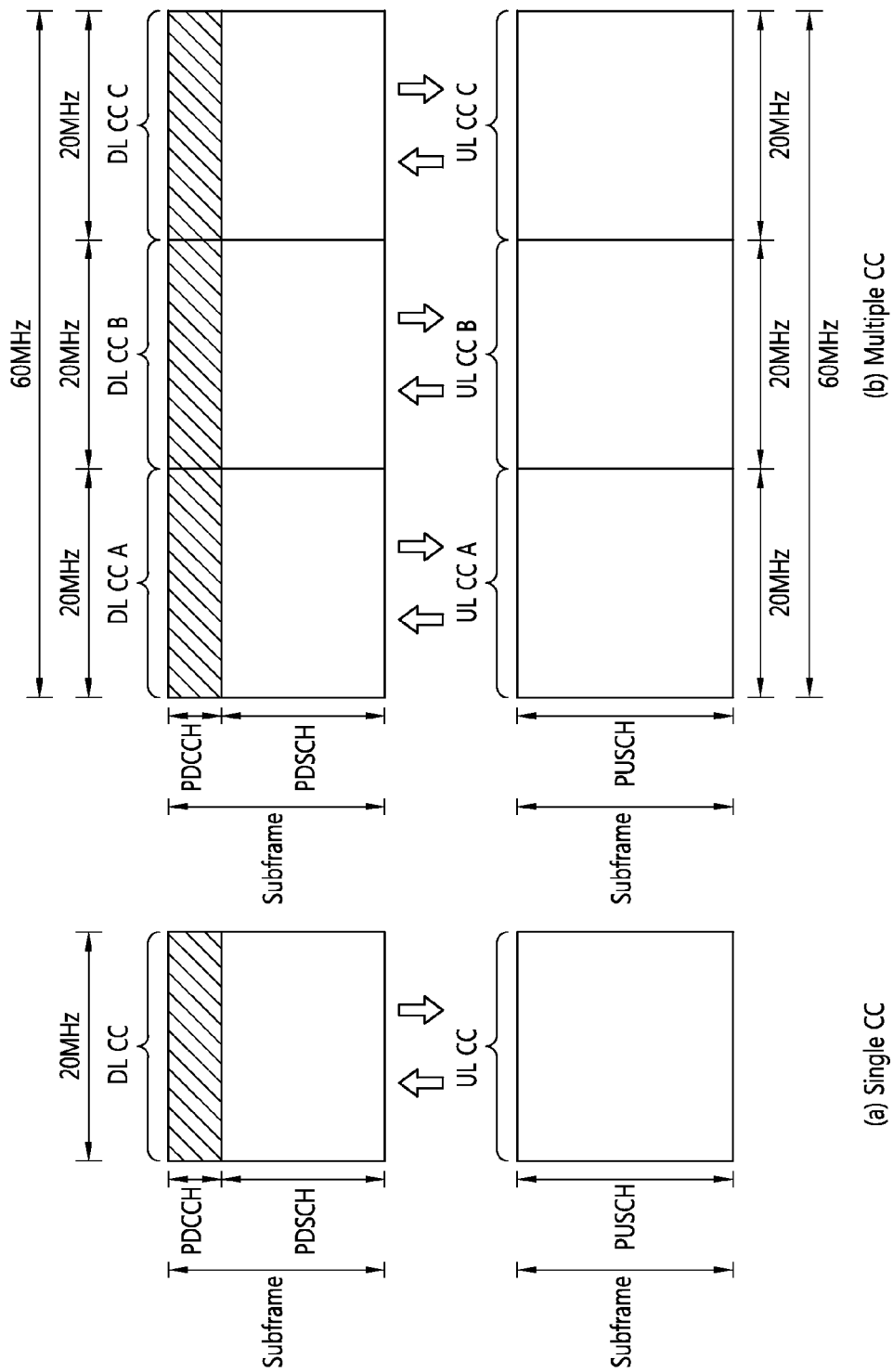
FIG. 9 shows an example of comparing a single carrier system and a carrier aggregation system.

FIG. 9 shows an example of comparing a single carrier system and a carrier aggregation system.

Although the carrier aggregation system (see FIG. 9(b)) has three DL CCs and three UL CCs, the number of DL CCs and the number of UL CCs are not limited thereto. A PDCCH and a PDSCH may be independently transmitted in each DL CC. A PUCCH and a PUSCH may be independently transmitted in each UL CC. Alternatively, the PUCCH may be transmitted only through a specific UL CC.

Since three DL CC-UL CC pairs are defined, it can be said that a UE receives a service from three serving cells.

The UE may monitor the PDCCH in a plurality of DL CCs, and may receive a DL transport block simultaneously via the plurality of DL CCs. The UE may transmit a plurality of UL transport blocks simultaneously via a plurality of UL CCs.

A pair of a DL CC #1 and a UL CC #1 may be a $1^{st}$ serving cell, a pair of a DL CC #2 and a UL CC #2 may be a $2^{nd}$ serving cell, and a DL CC #3 may be a $3^{rd}$ serving cell. Each serving cell may be identified by using a cell index (CI). The CI may be cell-specific or UE-specific.

The serving cell may be classified into a primary cell and a secondary cell. The primary cell is a cell designated as the primary cell when the UE performs an initial network entry process or starts a network re-entry process or performs a handover process. The primary cell is also called a reference cell. The secondary cell may be configured after an RRC connection is established, and may be used to provide an additional radio resource. At least one primary cell is configured always. The secondary cell may be added/modified/released by using higher-layer signaling (e.g., RRC messages). The CI of the primary cell may be fixed. For example, a lowest CI may be designated as a CI of the primary cell.

The carrier aggregation system may support cross-carrier scheduling. The cross-carrier scheduling is a scheduling method capable of performing resource allocation of a PDSCH transmitted by using a different CC through a PDCCH transmitted via a specific CC and/or resource allocation of a PUSCH transmitted via another CC other than a CC basically linked to the specific CC. That is, the PDCCH and the PDSCH may be transmitted through different DL CCs, and the PUSCH may be transmitted through a different UL CC other than a UL CC basically linked to a DL CC on which a PDCCH including a UL grant is transmitted. As such, in a system supporting the cross-carrier scheduling, a carrier indicator is required to report a specific DL CC/UL CC used to transmit the PDSCH/PUSCH for which the PDCCH provides control information. A field including the carrier indicator is hereinafter called a carrier indication field (CIF). Hereinafter, a scheduling carrier or a scheduling cell implies a carrier or serving cell for transmitting a UL grant or a DL grant, and a scheduled carrier or a scheduled cell implies a carrier or serving cell for receiving or transmitting a data channel by using the UL grant or the DL grant.

Non-cross carrier scheduling is a scheduling method extended from the conventional scheduling method. That is, it is a scheduling method in which a PDSCH and a PDCCH for scheduling the PDSCH are transmitted in the same DL CC. In addition, it is a scheduling method in which a PDCCH for scheduling a PUSCH is transmitted in a DL CC and a PUSCH is transmitted in a UL CC basically linked to the DL CC.

It is premised in the conventional carrier aggregation system that each serving cell uses only the same type of radio frames. In addition, it is premised that, if each serving cell operates with TDD, a TDD frame is used, and each serving cell has the same UL-DL configuration. However, it is also considered in a next-generation carrier aggregation system that each serving cell uses a different UL-DL configuration.

Figure 10:
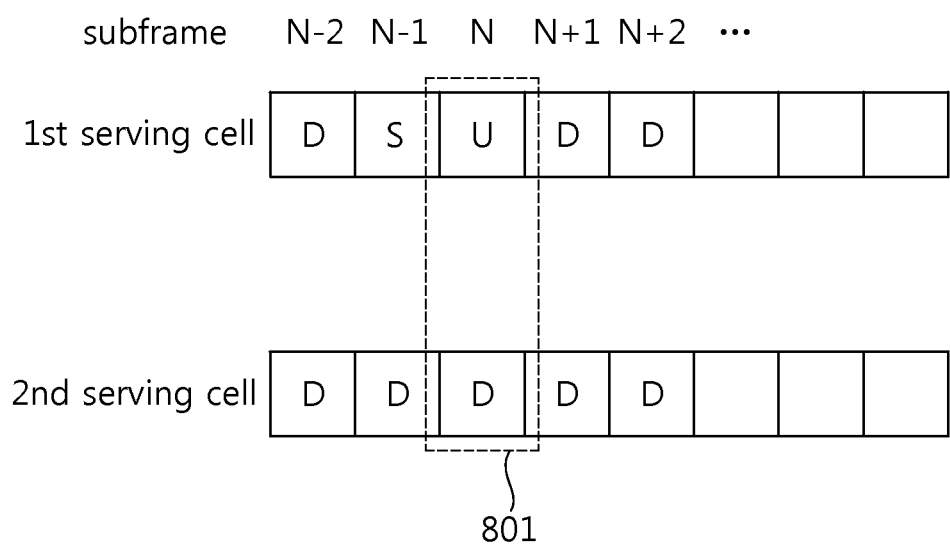
FIG. 10 shows an example in which each serving cell uses a different UL-DL configuration.

FIG. 10 shows an example in which each serving cell uses a different UL-DL configuration.

If each serving cell uses a different UL-DL configuration as shown in FIG. 10, there may be a case where transmission directions are not the same in some subframes. For example, a subframe N 801 may be configured as a UL subframe in a $1^{st}$ serving cell and may be configured as a DL subframe in a $2^{nd}$ serving cell, so that transmission directions are different.

Now, the present invention will be described.

As described above, an LTE system uses an FDD scheme and a TDD scheme, and a frame structure based on each scheme exists.

In case of the FDD scheme, a UL subframe and a DL subframe are always present in a 1:1 manner at the same time point. On the other hand, in case of the TDD scheme, a ratio of the UL subframe and the DL subframe is different for each UL-DL configuration. Therefore, although a frequency resource can be effectively used according to a UL/DL traffic ratio in case of TDD, there is a problem in that a significantly long delay occurs to change a UL-DL configuration and it is necessary to wait for an end of a HARQ process which has been running or to stop the HARQ process. As a result, an adaptive operation has a limitation if traffic changes rapidly.

Accordingly, various methods are considered, such as a method of using a specific subframe by applying it as a flexible subframe that can be configured dynamically as a UL or DL subframe despite of a UL-DL configuration in TDD, a method of aggregating TDD cells in which different UL-DL configurations are used, a method of aggregating an FDD cell using FDD and a TDD cell using TDD, etc.

The present invention premises that, if a plurality of cells are aggregated for a UE, a UL-DL configuration of the plurality of cells can be constructed variously. Under this premise, how to construct an ACK/NACK response bit-stream is provided as to a data channel (i.e., PDSCH) which is scheduled with a downlink or a control channel which requires an ACK/NACK response.

In case of FDD, a UL subframe and a DL subframe exist continuously in a 1:1 manner. Therefore, ACK/NACK response timing is constantly maintained as to a DL data channel (or a DL control channel requiring an ACK/NACK response, hereinafter, the same is true). That is, an ACK/NACK response transmitted in a subframe n is for a DL data channel of a subframe n−4.

On the other hand, in case of TDD, a specific subframe in a frame is a DL subframe or a UL subframe (for convenience, an S subframe is regarded as the DL subframe) according to the UL-DL configuration of Table 1 above.

In this case, the ratio of the UL subframe and the DL subframe in the frame may not be 1:1. Therefore, if the number of DL subframes corresponding to one UL subframe is M, M may be greater than or equal to 1 or 2. An ACK/NACK response transmitted in a subframe n which is a UL subframe is for a subframe n−$k_i$ ($k_i \in K$, where K is defined in Table 6, and the same is true hereinafter) which is a DL subframe. If an FDD cell or a TDD cell constructed with only a DL subframe is also included in Table 6, it may be expressed as shown in Table 9 below, and in this case, K may be given by Table 9 below. It may be specified that the TDD cell constructed with only the DL subframe is based on a definition of a TDD cell in terms of a transmission subframe of a primary synchronization signal (PSS) and a secondary synchronization signal (SSS) and a location of an OFDM symbol.

TABLE 9

| UL-DL Configu- ration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |
| 7 (It is applicable to FDD cell or to TDD cell consisting of only DL subframe) | 4 | 4 | 4 | 4 | 4 | 4 | 4 | 4 | 4 | 4 |

As shown in Table 9 above, in case of an FDD cell (or a TDD cell in which only a DL subframe exists), ACK/NACK transmitted in all subframes n can be expressed for a subframe n−$k_i$ ($k_i \in K$, K={4}).

Meanwhile, until LTE release 10, only FDD cells are aggregated or only TDD cells having the same UL-DL configuration are allowed for carrier aggregation, and multiple ACK/NACK transmission for a plurality of carriers or subframes based on the carrier aggregation may be configured to be transmitted using the PUCCH format 3.

In case of FDD, ACK/NACK is transmitted through a primary cell by being aggregated for the maximum number of codewords that can be transmitted in a transmission mode configured for each cell. In case of TDD, ACK/NACK (or bundled ACK/NACK) is transmitted through the primary cell by being aggregated for the maximum number of codewords that can be transmitted in a transmission mode configured for each DL subframe corresponding to a UL subframe for transmitting ACK/NACK according to a UL-DL configuration of each cell.

When M denotes the number of elements of the set K in the UL-DL configuration of Table 6 (or Table 9), in case of not including an S subframe of special subframe configurations 0 and 5 of a normal CP or an S subframe of special subframe configurations 0 and 4 of an extended CP, the number $B^{DL}_c$ of DL subframes corresponding to a UL subframe for transmitting ACK/NACK is M. That is, $B^{DL}_c = M$.

In Table 2 above, in case of including the S subframe of the special subframe configurations 0 and 5 of the normal CP or the S subframe of the special subframe configurations 0 and 4 of the extended CP, the number $B^{DL}_c$ of the DL subframes corresponding to the UL subframe for transmitting the ACK/NACK is M−1. That is, $B^{DL}_c = M−1$.

The aforementioned method is not for transmitting only an ACK/NACK response for an actually scheduled data channel (or a control channel which requests the ACK/NACK response) but for constructing an ACK/NACK response bit-stream according to a transmission mode based on a cell configuration and the value M. This is to decrease an error which may occur when a UE fails to receive a part of the data channel or control channel scheduled actually.

Meanwhile, in a future wireless communication system, a cell which performs scheduling (i.e., a scheduling cell), a cell which is subjected to scheduling (i.e., a scheduled cell), and a cell for transmitting ACK/NACK may be configured variously. In this case, HARQ ACK/NACK timing of FDD or TDD may be different from the conventional technique.

Figure 11:
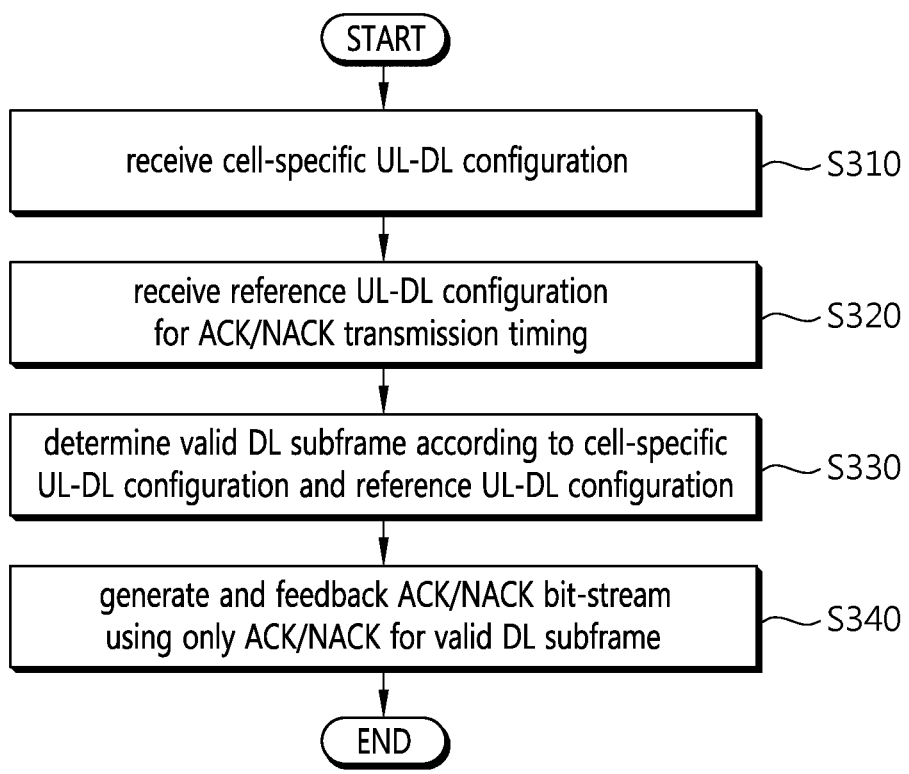
FIG. 11 shows an acknowledgement (ACK)/not-acknowledgement (NACK) transmission method according to an embodiment of the present invention.

FIG. 11 shows an ACK/NACK transmission method according to an embodiment of the present invention.

Referring to FIG. 11, a UE receives a cell-specific UL-DL configuration in a conventional manner (step 310). Herein, the cell-specific UL-DL configuration is any one of UL-DL configurations shown in Table 1, and indicates a subframe configuration for UE's DL data/control information reception and UL data/control information transmission.

The UE receives a reference UL-DL configuration for ACK/NACK transmission timing (step 320). The reference UL-DL configuration may be for reporting an ACK/NACK transmission time, not all pieces of control information transmitted by the UE. The reference UL-DL configuration may also be any one of the UL-DL configurations shown in Table 1, and a UL-DL configuration different from the cell-specific UL-DL configuration may be given.

The UE may determine a valid DL subframe according to a cell-specific UL-DL configuration and a reference UL-DL configuration (step S330), and may generate an ACK/NACK bit-stream by using only ACK/NACK for the valid DL subframe and thereafter may feedback it to a BS (step S340). A detailed method of determining the valid DL subframe is described below.

Figure 12:
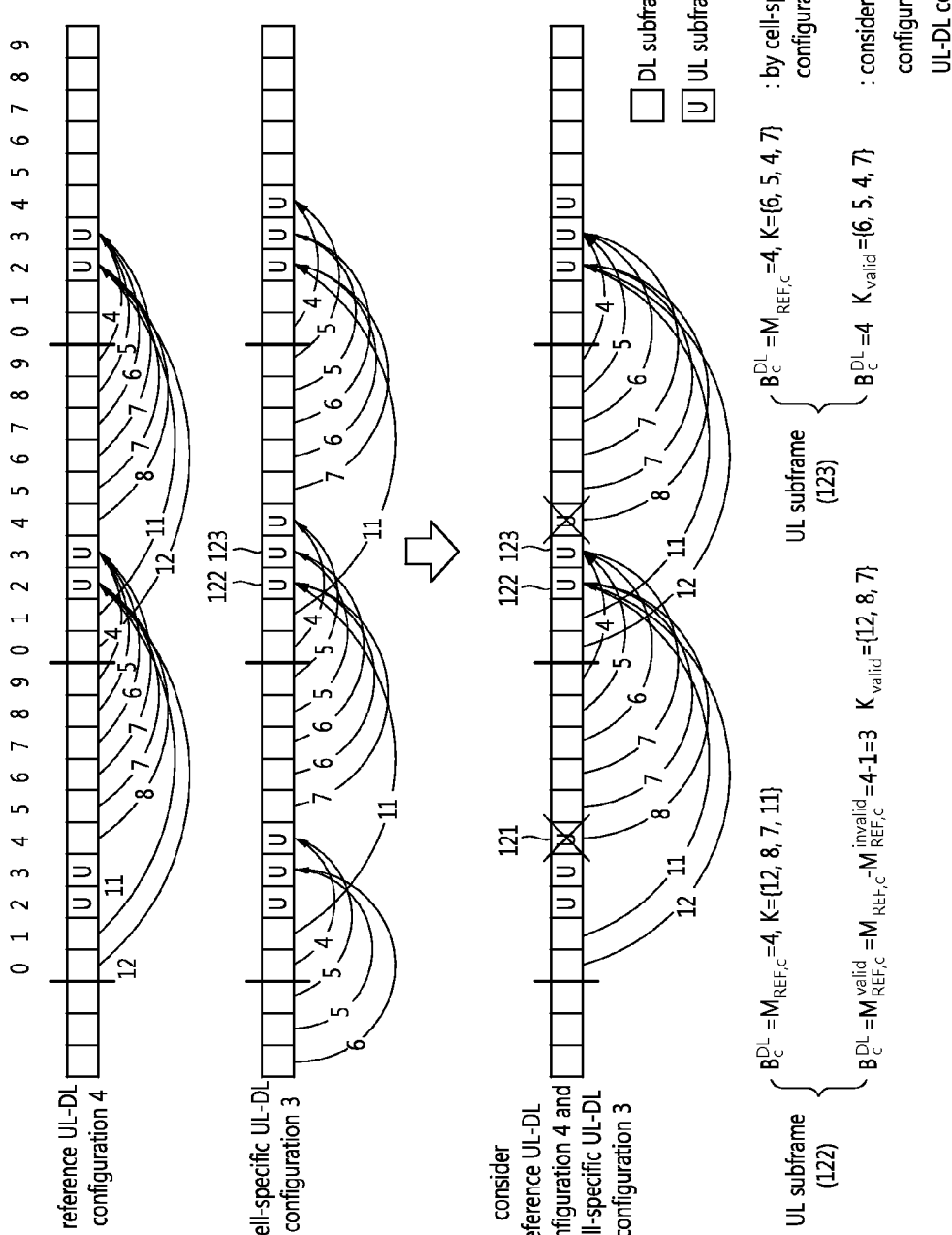
FIG. 12 shows a case of applying an ACK/NACK transmission method according to an embodiment of FIG. 11 in a greater detail.

FIG. 12 shows a case of applying the ACK/NACK transmission method according to the embodiment of FIG. 11 in a greater detail. In the drawings to be described below, an arrow mark indicates a UL subframe (indicated by U) which transmits ACK/NACK for a data unit received in a DL subframe, and a number indicated on the arrow mark indicates how many subframes exist after the DL subframe when ACK/NACK is transmitted in a UL subframe.

Referring to FIG. 12, a cell-specific UL-DL configuration of a specific cell (e.g., if a primary cell and a secondary cell are configured, the secondary cell) among cells configured for a UE may be a UL-DL configuration 3. The cell-specific UL-DL configuration may be configured using a system information block (SIB) 1 of the secondary cell.

In addition, the reference UL-DL configuration indicating timing for ACK/NACK transmission as to the secondary cell may be configured to a UL-DL configuration 4.

When considering the reference UL-DL configuration and the cell-specific UL-DL configuration as to the secondary cell, a subframe 4 (indicated by 121) is a UL subframe according to the UL-DL configuration 3 which is the cell-specific UL-DL configuration, and thus is not a DL subframe which is a target of an ACK/NACK response. Therefore, even if the UL-DL configuration 4 is used as the reference UL-DL configuration, the ACK/NACK response for the subframe 4 (indicated by 121) is unnecessary.

That is, according to the reference UL-DL configuration for a specific cell and a cell-specific UL-DL configuration configured for the specific cell, there may be a case where an ACK/NACK response for the specific subframe is unnecessary. For example, HARQ timing is set by assuming a DL subframe according to the reference UL-DL configuration and thus HARQ timing is set, whereas it is used as a UL subframe according to the cell-specific UL-DL configuration. Therefore, there may be a subframe (e.g., indicated by 121) which is not the target of ACK/NACK, and an ACK/NACK response for the subframe is unnecessary.

Therefore, when an ACK/NACK bit-stream is generated for each cell, the UE may generate the ACK/NACK bit-stream as to the maximum number of codewords that can be scheduled according to a corresponding transmission mode only for a valid DL subframe determined on the basis of the cell-specific UL-DL configuration and the reference UL-DL configuration. A DL subframe including a PDCCH (e.g., an SPS release PDCCH for releasing downlink SPS scheduling) which requires an ACK/NACK response may be included in the valid DL subframe. A subframe capable of dynamically adjusting a transmission direction of a corresponding subframe to any one of DL/UL directions may also be included in the valid DL subframe.

In this case, an ACK/NACK bit-stream to which spatial bundling is applied may be optionally generated.

Meanwhile, an S subframe may be exceptionally processed. This is because there may be a case where data channel transmission is not allowed according to a special subframe configuration. In addition, even if it is configured to transmit DL scheduling information through an enhanced (E)-PDCCH, since the E-PDCCH is not transmitted in an S subframe in which data channel transmission is not allowed, data transmission may not be performed for the subframe. Herein, the E-PDCCH is a control channel transmitted only for a band which is given in a UE-specific manner and can be transmitted in the existing PDSCH region. The E-PDCCH is decoded on the basis of a UE-specific reference signal, whereas a PDCCH is decoded on the basis of a cell-specific reference signal.

Therefore, whether the data channel transmission is possible may be determined according to a combination of S subframes of a scheduling cell and a scheduled cell, whether the E-PDCCH is used or not, and the like. Even if a data channel of the scheduled cell is not scheduled in the scheduling cell, in order to decrease complexity of implementation, a valid DL subframe may be determined only according to whether the data channel transmission is possible in the scheduled cell.

In a new carrier type (NCT), a location may change in a PSS and an SSS and a demodulation reference signal (DM RS) may not be able to be transmitted. For this reason, there may be a subframe in which an E-PDCCH configuration is impossible or data channel transmission is impossible. Although it is also preferable to construct an ACK/NACK bit-stream as to the NCT by considering whether it is a valid DL subframe according to a special subframe configuration, in order to decrease complexity in implementation, whether it is the valid DL subframe may be determined irrespective of the special subframe configuration, when the ACK/NACK bit-stream is constructed.

The ACK/NACK bit-stream determined in each cell may be concatenated in a cell index order.

In case of applying ACK/NACK timing based on the reference UL-DL configuration different from the cell-specific UL-DL configuration in each cell, the number of DL subframes corresponding to one UL subframe for transmitting ACK/NACK may be determined first according to the reference UL-DL configuration, and only an ACK/NACK bit-stream for a valid DL subframe may be generated among the plurality of DL subframes.

A BS may report the reference UL-DL configuration through a UE-specific RRC signal, or may configure it according to a pre-agreed rule. The cell-specific UL-DL configuration may be used as the reference UL-DL configuration.

Meanwhile, in Table 9, M denotes only the number of sets K of DL subframes corresponding to one UL subframe in the UL-DL configuration. That is, in Table 9, the UL subframe includes both a corresponding valid DL subframe and an invalid DL subframe. Therefore, information indicating the number of invalid DL subframes may be introduced to indicate the number of valid DL subframes by subtracting the number of invalid DL subframes from the set K. That is, without having to introduce a new UL-DL configuration other than the existing UL-DL configuration and without having to define a new set K, the invalid DL subframe can be constructed and added in a flexible manner.

This method can be applied when a UE is configured with a PUCCH format 1b channel selection for ACK/NACK transmission, or is configured with a PUCCH format 3. In addition, without being limited to a case of being transmitted through a PUCCH, the method may also be applied to a case of being transmitted through a PUSCH adjusted by a UL grant or even a case of being transmitted through a PUSCH not adjusted by the UL grant.

The aforementioned method may be expressed by the following equation.

As to a serving cell c (where c is an integer greater than or equal to 0) configured by RRC, ACK/NACK feedback bits $o_{c,0}^{ACK}\ o_{c,1}^{ACK}, \ldots, o_{c,O_c^{ACK}-1}^{ACK}$ are constructed as $O_c^{ACK} = B_c^{DL}$ if a transmission mode of the serving cell c supports one transport block (or codeword) or if spatial bundling is applied.

Otherwise, if the transmission mode of the serving cell c supports two transport blocks and the spatial bundling is not applied, $O_c^{ACK} = 2B_c^{DL}$. Herein $B_c^{DL}$ is the number of DL subframes which require an ACK/NACK response. The DL subframe which requires the ACK/NACK response may be determined as follows.

That is, if ACK/NACK is transmitted through a PUCCH or ACK/NACK is transmitted through a PUSCH which is not adjusted by a detected UL grant (in other word, a PUSCH transmitted without the UL grant), or if ACK/NACK is transmitted when a reference UL-DL configuration is a UL-DL configuration 0, the following is satisfied.

1) In a normal case of not including a specific S subframe (herein, the specific S subframe is an S subframe in which PDSCH transmission is not achieved due to a short DwPTS, and implies an S subframe of the special subframe configurations 0 and 5 of the normal CP (downlink) of Table 2 or an S subframe of the special subframe configurations 0 and 4 of the extended CP (downlink), and the same is true hereinafter), the number $B^{DL}_c$ of DL subframes which require an ACK/NACK response may be determined by the following equation.

$$B^{DL}_c = M^{valid}_c = M^{valid}_{REF,c} = M_{REF,c} - M^{invalid}_{REF,c} \quad \text{[Equation 5]}$$

2) In case of including the specific S subframe, if the specific spatial subframe is included in a validity determination target (or it is included in $M^{invalid}_{REF,c}$), the number $B^{DL}_c$ of DL subframes which require an ACK/NACK response may be determined as follows.

$$B^{DL}_c = M^{valid}_c = M^{valid}_{REF,c} = M_{REF,c} - M^{invalid}_{REF,c} \quad \text{[Equation 6]}$$

If the specific S subframe is not included in the validity determination target (or it is not included in $M^{invalid}_{REF,c}$), the number $B^{DL}_c$ of DL subframes which require an ACK/NACK response may be determined as follows.

$$B^{DL}_c = M^{valid}_c - 1 = M^{valid}_{REF,c} - 1 = M_{REF,c} - M^{invalid}_{REF,c} - 1 \quad \text{[Equation 7]}$$

In the above equations, $M^{valid}_c$ is the number of DL subframes corresponding to a UL subframe n for transmitting ACK/NACK for a serving cell c, and $M_{REF,c}$ is the number of elements of the set K in a DL subframe n-$k_i$ ($k_i \in K$, see Table 6 for K, hereinafter, the same is true) corresponding to the UL subframe n based on a reference UL-DL configuration applied to the serving cell c. $M^{valid}_{REF,c}$ is the number of valid DL subframes among the DL subframes n-$k_i$ ($k_i \in K$) corresponding to the UL subframe of the reference UL-DL configuration applied to the serving cell c, and $M^{invalid}_{REF,c}$ is the number of DL subframes which are not valid among the DL subframes n-$k_i$ ($k_i \in K$) corresponding to the UL subframe n of the reference UL-DL configuration applied to the serving cell c.

In this case, an ACK/NACK bit-stream is constructed only for a set $K^{valid}_{REF,c}$ constructed with a valid DL subframe in a set $K_{REF,c}$ of the reference UL-DL configuration, and is not constructed for a set $K^{invalid}_{REF,c}$ constructed with an invalid DL subframe.

A validity of a DL subframe, that is, whether it is a valid DL subframe, may be determined according to whether DL data (and/or DL control information) can be transmitted in carrier aggregation. When the reference UL-DL configuration is configured, the validity may be determined by considering the following aspects (an S subframe is considered separately).

In case of a subframe in which a transmission direction based on a cell-specific UL-DL configuration is different from a transmission direction based on a reference UL-DL configuration, a UE may designate the subframe as an "X" subframe which is not used. The X subframe is an unused subframe, and is a subframe configured differently because cell-specific UL-DL configurations transmitted from respective SIBs of a plurality of aggregated cells are different, when carrier aggregation is applied to the UE supporting half duplex (only any one of transmission and reception is supported at a specific time). For example, if cells A and B are aggregated, a subframe which is configured as a DL subframe in the cell A and is configured as a UL subframe in the cell B may be designated as an X subframe. The X subframe may be a subframe which cannot be used by the UE.

Meanwhile, it is assumed that the UE operates with full duplex (it supports transmission and reception simultaneously at a specific time) if cells applied with different UL-DL configurations are aggregated in TDD.

1) If a reference UL-DL configuration of a serving cell c is equal to a cell-specific UL-DL configuration, $M^{invalid}_{REF,c} = 0$ as long as there is no particular restriction on DL subframe scheduling. This is a case where a scheduling cell is the same as a scheduled cell, and a primary cell is a representative example thereof.

If cross-carrier scheduling is applied to the serving cell c, and a subframe n-$k_i$ of the scheduling cell is not a DL subframe and cross subframe/bundled subframe scheduling or the like is not supported and thus DL scheduling is impossible for the subframe n-$k_i$ of the serving cell c, then such a subframe may be an invalid subframe.

2) The reference UL-DL configuration of the serving cell c may be different from the cell-specific UL-DL configuration. In this case, if a subframe n-$k_i$ defined in the reference UL-DL configuration is not a DL subframe in the cell-specific UL-DL configuration, such a subframe may be an invalid DL subframe.

For example, if a DL subframe based on a cell-specific UL-DL configuration of a secondary cell is a sub-set of a DL subframe defined in a cell-specific UL-DL configuration of a primary cell, a reference UL-DL configuration of the secondary cell may be a cell-specific UL-DL configuration of the primary cell. Then, a subframe of the secondary cell, which is not an intersection with a valid DL subframe of the primary cell, is an invalid DL subframe.

Alternatively, the configuration of Table 1 in which all UL subframes of the secondary cell are included in an intersection of UL subframes based on the cell-specific UL-DL configuration of the secondary cell and UL subframes based on the cell-specific UL-DL configuration of the primary cell may be the reference UL-DL configuration of the secondary cell. If such a UL-DL configuration is plural in number, a UL-DL configuration having the greater number of UL subframes may be selected. A subframe of the secondary cell, which does not coincide with a DL subframe of the reference UL-DL configuration, is an invalid DL subframe.

3) There is a case where an aggregation between cells configured with different TDD UL-DL configurations is applied and a UE operates with half duplex.

In this case, even if a reference UL-DL configuration of a serving cell c is equal to a cell-specific UL-DL configuration of the serving cell c, an X subframe may be generated according to a transmission direction of aggregated different cells. Accordingly, such an X subframe is an invalid subframe.

In case of the primary cell, the cell-specific UL-DL configuration of the primary cell may be used as the reference UL-DL configuration of the primary cell. If a transmission direction of the primary cell is applied to aggregated different cells, since an X subframe is not generated in the primary cell, $M^{invalid}_{REF,c} = 0$.

In case of the secondary cell, the DL subframe based on the cell-specific UL-DL configuration of the serving cell c is an invalid subframe since it does not coincide with the reference UL-DL configuration, or an X subframe which is generated when a transmission direction of aggregated different cells is different from that of the cell-specific UL-DL configuration may be an invalid subframe.

4) In a case where the reference UL-DL configuration of the serving cell c is different from the cell-specific UL-DL configuration, if a subframe $n-k_i$ defined in the reference UL-DL configuration is not a DL subframe in the cell-specific UL-DL configuration, such a subframe may be an invalid DL subframe. In addition, an X subframe which is generated when a transmission direction of the aggregated different cells is different from that of the cell-specific UL-DL configuration of the serving cell c may be an invalid DL subframe.

For example, according to the cell-specific UL-DL configuration of the secondary cell, if a subframe which is a DL subframe is a sub-set of DL subframes defined in the cell-specific UL-DL configuration of the primary cell, the reference UL-DL configuration of the secondary cell may be the cell-specific UL-DL configuration of the primary cell. In this case, a subframe of the secondary cell, which is not an intersection of the valid DL subframe of the primary cell, is an invalid DL subframe. In this case, a case where the DL subframe of the secondary cell is the X subframe does not occur.

Alternatively, similarly to the UE operating with the full duplex, the configuration of Table 1 in which all UL subframes of the secondary cell are included in an intersection of UL subframes of the cell-specific UL-DL configuration of the secondary cell c and the cell-specific UL-DL configuration of the primary cell may be the reference UL-DL configuration of the secondary cell. If such a configuration is plural in number, a UL-DL configuration having the maximum number of UL subframes may be selected. A subframe of the secondary cell, which is not an intersection of a DL subframe in the reference UL-DL configuration, is an invalid DL subframe. In addition, if an X subframe is generated when a transmission direction of different cells is different from that of the cell-specific UL-DL configuration of the secondary cell, it may be an invalid subframe.

5) There is a case where a UE is configured with an aggregation of cells which use different frame structures (i.e., an FDD frame and a TDD frame).

5-1) In a case where the reference UL-DL configuration of the serving cell c is equal to the cell-specific UL-DL configuration, if there is no restriction on special DL subframe scheduling, $M^{invalid}_{REF,c}=0$. This is a case where a scheduling cell is the same as a scheduled cell, and a primary cell is a representative example thereof.

If the serving cell c is subjected to cross-carrier scheduling, a subframe $n-k_i$ of a scheduling cell is not a DL subframe, and cross-subframe/bundled-subframe scheduling is not supported and thus the subframe $n-k_i$ of the serving cell c is not the DL subframe, then such a subframe may be an invalid DL subframe. If an FDD cell is a primary cell, since all subframes exist in pair of a UL subframe and a DL subframe, such a case does not occur. If a TDD cell is the primary cell, the above case may occur in a UL subframe of the primary cell.

5-2) There is a case where the reference UL-DL configuration of the serving cell c is different from the cell-specific UL-DL configuration.

If the subframe $n-k_i$ defined in the reference UL-DL configuration is not the DL subframe in the cell-specific UL-DL configuration, this subframe may be an invalid DL subframe. For example, according to the cell-specific UL-DL configuration of the secondary cell operating with FDD (or a cell in which only a DL subframe exists), if a subframe which is a DL subframe is a sub-set of the DL subframe defined in the cell-specific UL-DL configuration of the primary cell operating with TDD, the reference UL-DL configuration of the secondary cell may be the cell-specific UL-DL configuration of the primary cell. In this case, a subframe of the secondary cell, which is not a DL intersection with respect to a valid DL subframe of the primary cell, is an invalid subframe.

Figure 13:
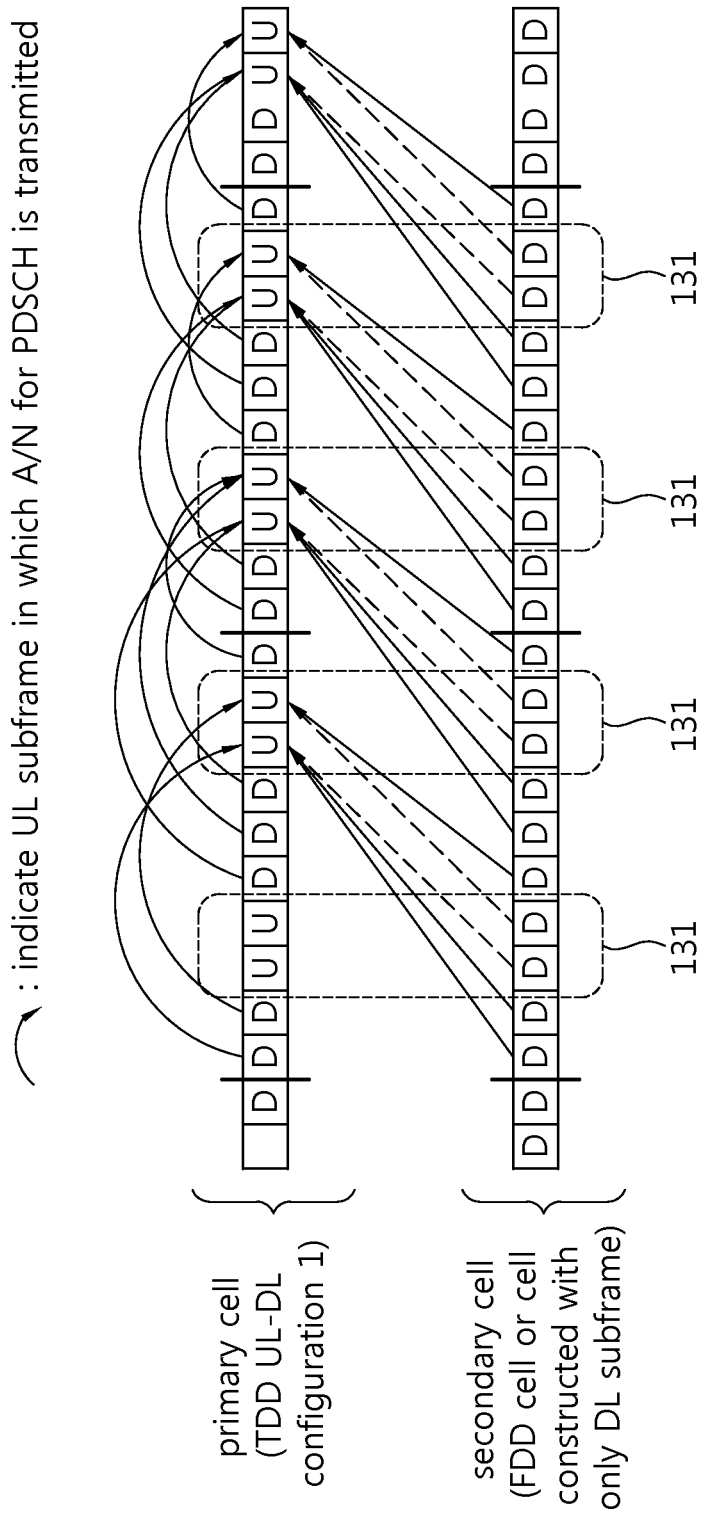
FIG. 13 shows an example of an ACK/NACK transmission method in which a primary cell uses a TDD frame structure and a secondary cell uses an FDD frame structure.

FIG. 13 shows an example of an ACK/NACK transmission method in which a primary cell uses a TDD frame structure and a secondary cell uses an FDD frame structure.

Referring to FIG. 13, a UL-DL configuration 1 of TDD is applied to the primary cell. The secondary cell is an FDD cell (or a cell in which only a DL subframe exists).

If the secondary cell is self-scheduled, DL subframes 131 indicated by a dotted line can be utilized and thus can be a target of ACK/NACK.

However, if the secondary cell is cross-carrier scheduled in the primary cell, the DL subframes 131 indicated by the dotted line cannot be utilized. This is because corresponding subframes of the primary cell are UL subframes and thus the DL subframes, indicated by the dotted line, of the secondary cell cannot be scheduled. Therefore, it is preferable not to construct an ACK/NACK bit-stream for the DL subframes indicated by the dotted line. This is a case where cross subframe scheduling is not supported, and if the cross subframe scheduling is supported, it may be allowed to construct the ACK/NACK bit-stream for the DL subframes indicated by the dotted line. The cross subframe scheduling is for allowing a subframe in which a scheduling control channel is transmitted and a subframe in which a data channel scheduled by using the subframe to exist in different subframes.

A reference UL-DL configuration of the secondary cell may be a UL-DL configuration in which all UL subframes are included in an intersection of UL subframes of a cell-specific UL-DL configuration of the secondary cell and a cell-specific UL-DL configuration of the primary cell. In this case, a UL-DL configuration having the maximum number of UL subframes may be selected.

A subframe of the secondary cell, which is not an intersection of DL subframes of the reference UL-DL configuration, is an invalid subframe. A DL subframe to which timing is not set may be excluded, or additional timing may be set.

Figure 14:
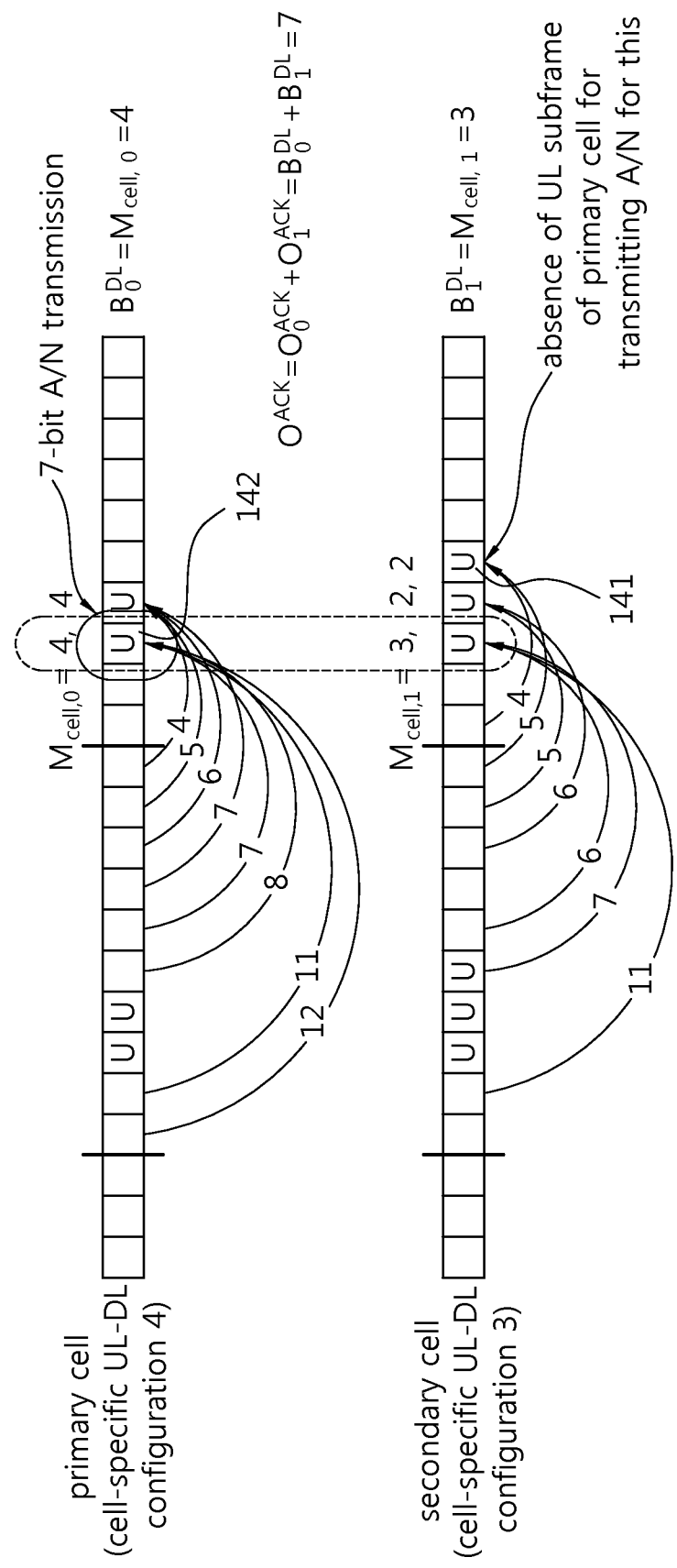
FIG. 14 shows a method of transmitting ACK/NACK according to a cell-specific UL-DL configuration of a plurality of cells configured for a user equipment.
Figure 15:
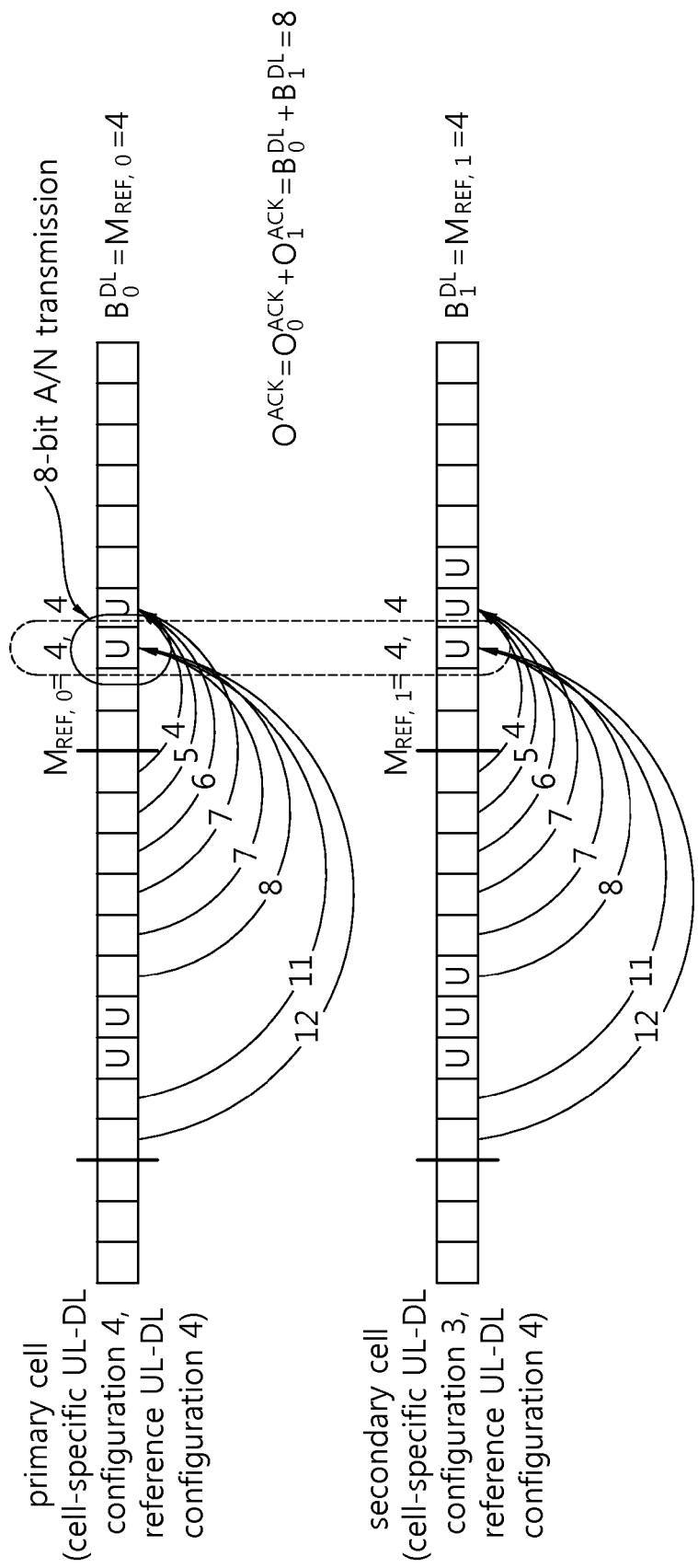
FIG. 15 shows a method of transmitting ACK/NACK according to a reference UL-DL configuration of each cell.
Figure 16:
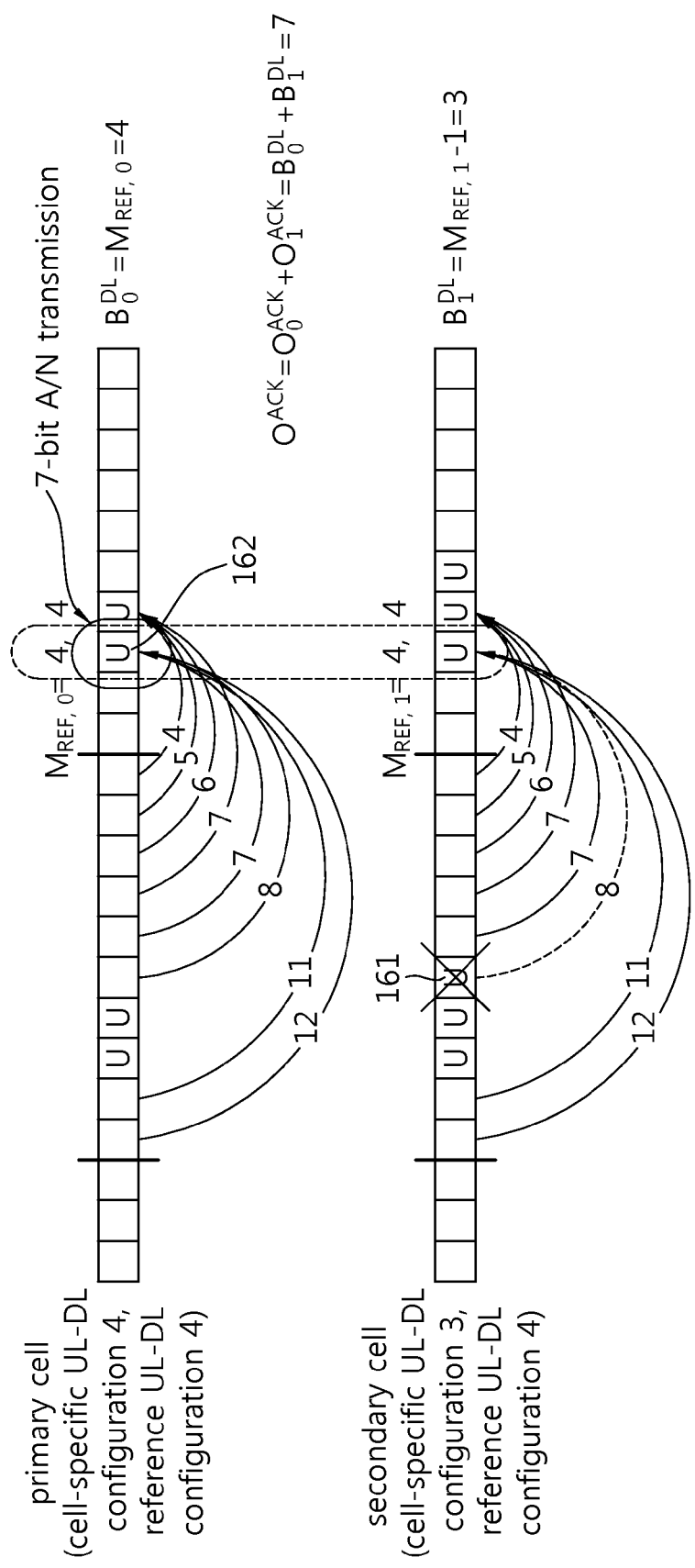
FIG. 16 shows a method of transmitting ACK/NACK by considering a reference UL-DL configuration and a valid DL subframe.

FIG. 14 to FIG. 16 show ACK/NACK transmission methods when all cells are configured to a transmission mode capable of transmitting up to one transport block.

FIG. 14 shows a method of transmitting ACK/NACK according to a cell-specific UL-DL configuration of a plurality of cells configured for a UE.

Referring to FIG. 14, a primary cell and a secondary cell transmit ACK/NACK according to the cell-specific UL-DL configuration. For example, a UL-DL configuration 4 and a UL-DL configuration 3 may be configured respectively for the primary cell and the secondary cell as the cell-specific UL-DL configuration.

In this case, ACK/NACK($O^{ACK}$) transmitted in a UL subframe 142 of the primary cell may be 7 bits in total. That is, since the number of DL subframes corresponding to the UL subframe 142 is 4 (i.e., $M_{CELL,0}=4$) in the primary cell, ACK/NACK($O^{ACK}_0$) may be 4 bits, and since the number of DL subframes corresponding to the UL subframe 142 is 3 (i.e., $M_{CELL,0}=3$) in the secondary cell, ACK/NACK($O^{ACK}_1$) is 3 bits.

In general, there is a DL subframe corresponds to a set $K_c$ of UL subframes for a cell c according to a cell-specific UL-DL configuration, and thus the number $M_c$ of elements of the set $K_c$ is the number of DL subframes corresponding to the UL subframe. When a different ACK/NACK bit-stream is constructed for the cell-specific UL-DL configuration, there may be a case where ACK/NACK cannot be transmitted for timing of some secondary cells.

For example, in FIG. 14, ACK/NACK cannot be transmitted in the primary cell since the subframe of the primary cell, which corresponds to the UL subframe 141 of the secondary cell, is the DL subframe.

FIG. 15 shows a method of transmitting ACK/NACK according to a reference UL-DL configuration of each cell.

Referring to FIG. 15, a cell-specific UL-DL configuration and a reference UL-DL configuration may be applied to a primary cell and a secondary cell. For example, in the primary cell, a UL-DL configuration 4 may be configured as the cell-specific UL-DL configuration, and the UL-DL configuration 4 may be configured as the reference UL-DL configuration, and in the secondary cell, a UL-DL configuration 3 may be configured as the cell-specific UL-DL configuration, and the UL-DL configuration 4 may be configured as the reference UL-DL configuration. That is, the cell-specific UL-DL configuration and the reference UL-DL configuration are the same in the primary cell, the cell-specific UL-DL configuration and the reference UL-DL configuration are different in the secondary cell, and the primary cell and the secondary cell have the same reference UL-DL configuration.

If ACK/NACK is transmitted according to the reference UL-DL configuration, $M_{REF,C}$, that is, the number of DL subframes corresponding to a set $K_{REF,C}$ of UL subframes based on a reference UL-DL configuration indicated by a UE, is the number of DL subframes.

According to this method, although there is a disadvantage in that ACK/NACK for a DL subframe which cannot be actually scheduled may also be included in an ACK/NACK bit-stream, there is an advantage in that a simple operation is possible irrespective of a subframe validity which varies for each UL-DL configuration combination. ACK/NACK for an invalid DL subframe is transmitted as NACK. In this method, an unnecessary ACK/NACK bit may exist, but performance deterioration may not be significant since such an ACK/NACK bit is excluded in power allocation when transmitted through a PUCCH.

As to a serving cell c configured by RRC, it is assumed that ACK/NACK feedback bits are $o_{c,0}^{ACK}$ $o_{c,1}^{ACK}$, ..., $o_{c,O^{ACK}_{c}-1}^{ACK}$. The ACK/NACK bits are constructed as $O^{ACK}_c = B^{DL}_c$ if a transmission mode supports one transport block or if spatial bundling is applied, and are constructed as $O^{ACK}_c = 2 B^{DL}_c$ if the transmission mode supports two transport blocks or the spatial bundling is not applied.

If ACK/NACK is transmitted through a PUCCH or ACK/NACK is transmitted through a PUSCH which is not adjusted by a detected UL grant (in other word, a PUSCH transmitted without the UL grant), or if ACK/NACK is transmitted when a reference UL-DL configuration is a UL-DL configuration 0, the followings are satisfied: 1) In a normal case of not including a specific S subframe (i.e., as an S subframe in which PDSCH transmission is not achieved due to a short DwPTS, an S subframe of the special subframe configurations 0 and 5 of the normal CP (downlink) or an S subframe of the special subframe configurations 0 and 4 of the extended CP (downlink), see Table 2), $B^{DL}_c = M_{REF,c}$; and 2) In case of including the specific S subframe, $B^{DL}_c = M_{REF,c} - 1$. Herein, $M_{REF,c}$ is the number of elements of the set $K_{REF,c}$ in a DL subframe $n-k_i$ ($k_i \in K$) corresponding to the UL subframe n based on a reference UL-DL configuration applied to the serving cell c.

FIG. 16 shows a method of transmitting ACK/NACK by considering a reference UL-DL configuration and a valid DL subframe.

Referring to FIG. 16, a cell-specific UL-DL configuration and a reference UL-DL configuration are configured equally in a primary cell and a secondary cell as shown in FIG. 15.

In this case, unlike FIG. 15, ACK/NACK for an invalid DL subframe of the secondary cell is not transmitted, and only ACK/NACK for a valid DL subframe is transmitted through the primary cell. For example, since a subframe 161 of the secondary cell is an invalid DL subframe, ACK/NACK for this subframe is excluded from an ACK/NACK bit-stream transmitted in a UL subframe 162 of the primary cell.

In this case, ACK/NACK($O^{ACK}$) transmitted in the UL subframe 162 of the primary cell may be 7 bits in total. That is, since the number of valid DL subframes corresponding to the UL subframe 162 is 4 (i.e., $M_{REF,0}=4$) in the primary cell, ACK/NACK($O^{ACK}_0$) may be 4 bits. Further, although the number of DL subframes corresponding to the UL subframe 162 is 4 in the secondary cell, among them, the UL subframe 161 is excluded since it is an invalid UL subframe. Therefore, since the number of valid DL subframes is 3 (i.e., $M_{REF,1}=3$), ACK/NACK($O^{ACK}_1$) is 3 bits.

In general, as to a cell c, the number of DL subframes corresponding to a set $K^{valid}_{REF,C}$ of valid DL subframes except for DL subframes corresponding to a set $K^{invalid}_{REF,C}$ of an invalid DL subframes among DL subframes corresponding to a set $K_{REF,C}$ of UL subframes based on the reference UL-DL configuration, in other words, the number $M^{valid}_{REF,c}$ ($=M_{REF,c}-M^{invalid}_{REF,c}$) of elements of the set $K^{valid}_{REF,C}$ is the number of DL subframes corresponding to a UL subframe.

In a case where ACK/NACK is transmitted through a PUSCH by a detected UL grant (PDCCH DCI format 0/4) and $W^{UL}_{DAI}$ can be acquired from a PDCCH, if $M_{REF,c} \leq W^{UL}_{DAI}$, the number of DL subframes requiring an ACK/NACK response for each cell may be acquired as follows.

1) In a normal case of not including a specific S subframe (i.e., as an S subframe in which PDSCH transmission is not achieved due to a short DwPTS, an S subframe of the special subframe configurations 0 and 5 of the normal CP or an S subframe of the special subframe configurations 0 and 4 of the extended CP), $B^{DL}_c = \min(M^{valid}_c, W^{UL}_{DAI}) = \min(M^{valid}_{REF,c}, W^{UL}_{DAI}) = \min(M_{REF,c} - M^{invalid}_{REF,c}, W^{UL}_{DAI})$.

2) In case of including the specific S subframe, if the specific spatial subframe is included in a validity determination target (or it is included in $M^{invalid}_{REF,c}$), $B^{DL}_c = \min(M^{valid}_c, W^{UL}_{DAI}) = \min(M^{valid}_{REF,c}, W^{UL}_{DAI}) = \min(M_{REF,c} - M^{invalid}_{REF,c}, W^{UL}_{DAI})$. Otherwise, if the specific S subframe is not included in the validity determination target (or it is not included in $M^{invalid}_{REF,c}$), $B^{DL}_c = \min(M^{valid}_c - 1, W^{UL}_{DAI}) = \min(M^{valid}_{REF,c} - 1, W^{UL}_{DAI}) = \min(M_{REF,c} - M^{invalid}_{REF,c} - 1, W^{UL}_{DAI})$.

Herein, $W^{UL}_{DAI}$ is a value determined as shown in the following table according to DAI included in the DCI format 0/4 when two or more serving cells (i.e., TDD cells) are configured for the UE or when one serving cell is configured for the UE and the PUCCH format 3 is configured.

TABLE 10

| DAI MSB, LSB | $W_{DAI}^{UL}$ |
|---|---|
| 0, 0 | 1 |
| 0, 1 | 2 |
| 1, 0 | 3 |
| 1, 1 | 4 |

The above method is for constructing an ACK/NACK bit-stream on the basis of a minimum value in comparison with a value $W^{UL}_{DAI}$ indicated by the BS to the UE and ($M_{REF,c} - M^{invalid}_{REF,c}$), in order to avoid unnecessary ACK/NACK transmission for a DL subframe which is not actually scheduled.

Alternatively, when ACK/NACK is transmitted through a PUSCH by using a detected UL grant (PDCCH DCI format 0/4) and the value $W^{UL}_{DAI}$ can be acquired from a PDCCH, if $M_{REF,c} > W^{UL}_{DAI}$, the number of DL subframes requiring an ACK/NACK response for each cell may be acquired as follows. Herein, Ceil(x) denotes a smallest integer among values greater than or equal to x. In addition, U denotes a maximum value of $U_C$ among all configured serving cells, and $U_C$ denotes the total number of PDSCH and DL SPS release PDCCHs received in a subframe n−k (k∈K) of a serving cell c.

1) In a normal case of not including a specific S subframe (i.e., as an S subframe in which PDSCH transmission is not achieved due to a short DwPTS, an S subframe of the special subframe configurations 0 and 5 of the normal CP or an S subframe of the special subframe configurations 0 and 4 of the extended CP), $B^{DL}_c = \min(M^{valid}_c, W^{UL}_{DAI} + 4\text{ceil}((U-W^{UL}_{DAI})/4)) = \min(M^{valid}_{REF,c}, W^{UL}_{DAI} + 4\text{ceil}((U-W^{UL}_{DAI})/4))) = \min(M_{REF,c} - M^{invalid}_{REF,c}, W^{UL}_{DAI} + 4\text{ceil}((U-W^{UL}_{DAI})/4)))$.

2) In case of including the specific S subframe, if the specific spatial subframe is included in a validity determination target (or it is included in $M^{invalid}_{REF,c}$), $B^{DL}_c = \min(M^{valid}_c, W^{UL}_{DAI} + 4\text{ceil}((U-W^{UL}_{DAI})/4)) = \min(M^{valid}_{REF,c}, W^{UL}_{DAI} + 4\text{ceil}((U-W^{UL}_{DAI})/4))) = \min(M_{REF,c} - M^{invalid}_{REF,c}, W^{UL}_{DAI} + 4\text{ceil}(U-W^{UL}_{DAI})/4)))$. Otherwise, if the specific S subframe is not included in the validity determination target (or it is not included in $M^{invalid}_{REF,c}$), $B^{DL}_c = \min(M^{valid}_c - 1, W^{UL}_{DAI} + 4\text{ceil}((U-W^{UL}_{DAI})/4)) = \min(M^{valid}_{REF,c} - 1, W^{UL}_{DAI} + 4\text{ceil}((U-W^{UL}_{DAI})/4))) = \min(M_{REF,c} - M^{invalid}_{REF,c} - 1, W^{UL}_{DAI} + 4\text{ceil}(U-W^{UL}_{DAI})/4)))$.

$M^{valid}_c$ is the number of valid DL subframes corresponding to a UL subframe n for transmitting ACK/NACK for the serving cell c, and $M_{REF,c}$ is the number of elements of the set K in a DL subframe n−$k_i$ ($k_i \in K$) corresponding to the UL subframe n based on a reference UL-DL configuration applied to the serving cell c. $M^{valid}_{REF,c}$ is the number of valid DL subframes among the DL subframes n−$k_i$ ($k_i \in K$) corresponding to the UL subframe of the reference UL-DL configuration applied to the serving cell c, and $M^{invalid}_{REF,c}$ is the number of DL subframes which are not valid among the DL subframes n−$k_i$ ($k_i \in K$) corresponding to the UL subframe n of the reference UL-DL configuration applied to the serving cell c. An ACK/NACK bit-stream is constructed only for a set $K^{valid}_{REF,c}$ constructed with a valid DL subframe in a set $K_{REF,c}$ of the reference UL-DL configuration, and is not constructed for a set $K^{invalid}_{REF,c}$ constructed with an invalid DL subframe.

The above method is for constructing an ACK/NACK bit-stream on the basis of a minimum value in comparison with $W^{UL}_{DAI} + 4\text{ceil}((U-W^{UL}_{DAI})/4)$ and $M_{REF,c} - M^{invalid}_{REF,c}$ by considering a value $W^{UL}_{DAI}$ indicated by the BS to the UE and the number of actually scheduled subframes, in order to avoid unnecessary ACK/NACK transmission for a DL subframe which is not actually scheduled.

If ACK/NACK is transmitted with a PUCCH format 3, power may be allocated only to actually valid ACK/NACK information even if an unnecessary resource is reserved. On the other hand, if ACK/NACK is transmitted through a PUSCH by being multiplexed with uplink shared channel (UL-SCH) data or channel state information (CSI) information, it is not possible to decrease only power allocation for coded bits of the ACK/NACK, and thus resources may be wasted unnecessarily. Therefore, to simplify an operation of ACK/NACK transmitted through a PUCCH, even if an ACK/NACK bit-stream is constructed for a DL subframe corresponding to $K_{REF,C}$ of the reference UL-DL configuration as shown in FIG. 15, in particular, for the ACK/NACK transmitted through the PUSCH, in order to transmit only available valid ACK/NACK information, the ACK/NACK bit-stream may be constructed only with ACK/NACK for a valid DL subframe other than ACK/NACK for an invalid DL subframe in $K_{REF,C}$ of the reference UL-DL configuration as described above with reference to FIG. 16.

The aforementioned method may be applied only to an aggregation between cells having different frame structures. In addition, the present invention is also applicable to a case where a PUCCH format 1b channel selection is applied to a target subframe for constructing ACK/NACK.

Figure 17:
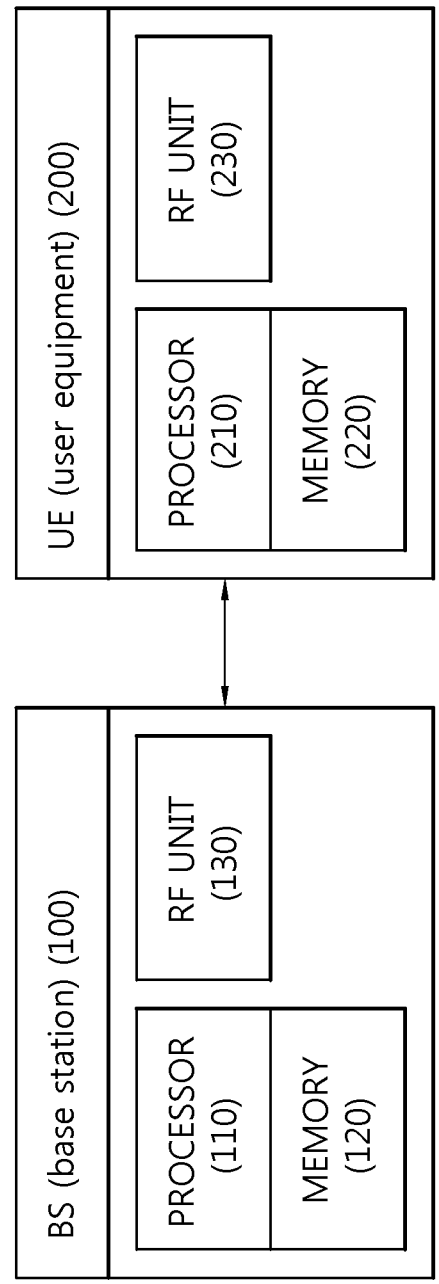
FIG. 17 is a block diagram of a wireless device according to an embodiment of the present invention.

FIG. 17 is a block diagram of a wireless device according to an embodiment of the present invention.

A BS 100 includes a processor 110, a memory 120, and a radio frequency (RF) unit 130. The processor 110 implements the proposed functions, procedure, and/or methods. For example, the processor 110 transmits a cell-specific UL-DL configuration and reference UL-DL configuration for a serving cell configured for a UE, and transmits a data unit which is a target of ACK/NACK. The data unit includes a transport block (or codeword) included in a PDSCH and a PDSCH and control information (e.g., a DL SPS release PDCCH) requiring ACK/NACK. In addition, an ACK/NACK bit-stream consisting of only ACK/NACK for a valid DL subframe is feed-backed. The memory 120 is coupled to the processor 110, and stores a variety of information for driving the processor 110. The RF unit 130 is coupled to the processor 110, and transmits and/or receives a radio signal.

A UE 200 includes a processor 210, a memory 220, and an RF unit 230. The processor 210 implements the proposed functions, procedures, and/or methods. For example, the processor 210 may receive a cell-specific uplink-downlink (UL-DL) configuration for one serving cell among a plurality of serving cells, receive a reference UL-DL configuration for one serving cell, determine a valid DL subframe capable of actually receiving a data unit in one serving cell on the basis of the cell-specific UL-DL configuration and the reference UL-DL configuration, and generate only ACK/NACK for the valid DL subframe as a bit-stream and feedback the bit-stream. The valid DL subframe is a DL subframe which is not an invalid DL subframe among DL subframes, and examples of the invalid DL subframe are described above. The memory 220 is coupled to the processor 210, and stores a variety of information for driving the processor 210. The RF unit 230 is coupled to the processor 210, and transmits and/or receives a radio signal.

The processors 110 and 210 may include an application-specific integrated circuit (ASIC), a separate chipset, a logic circuit, and/or a data processing unit and/or a converter for mutually converting a baseband signal and a radio signal. The memories 120 and 220 may include a read-only memory (ROM), a random access memory (RAM), a flash memory, a memory card, a storage medium, and/or other equivalent storage devices. The RF units 130 and 230 may include a base-band circuit for processing a radio signal. When the embodiment of the present invention is implemented in software, the aforementioned methods can be implemented with a module (i.e., process, function, etc.) for performing the aforementioned functions. The module may be stored in the memories 120 and 220 and may be performed by the processors 110 and 210. The memories 120 and 220 may be located inside or outside the processors 110 and 210, and may be coupled to the processors 110 and 210 by using various well-known means.

What is claimed is:

1. A method of transmitting acknowledgement (ACK)/not-acknowledgement (NACK) of a user equipment configured with a plurality of serving cells, the method comprising:
    receiving a cell-specific uplink (UL)-downlink (DL) configuration for a secondary cell among the plurality of serving cells,
    wherein the cell-specific UL-DL configuration is information which configures subframes in a frame of the secondary cell to a UL subframe or a DL subframe;
    receiving a reference UL-DL configuration for the secondary cell,
    wherein the reference UL-DL configuration is information which indicates an ACK/NACK transmission time by configuring the subframes in the frame to the UL subframe or the DL subframe;
    determining valid DL subframes capable of actually receiving a data unit in the secondary cell on the basis of the cell-specific UL-DL configuration and the reference UL-DL configuration; and
    constructing ACK/NACK only for the valid DL subframes in a form of a bit-stream and feed-backing the bit-stream,
    wherein the reference UL-DL configuration for the secondary cell is a cell-specific UL-DL configuration for a primary cell, and
    wherein, when the primary cell uses a time division duplex (TDD) frame and the secondary cell uses a frequency division duplex (FDD) frame, a DL subframe which overlaps with a UL subframe of the TDD frame among DL subframes included in the FDD frame is excluded from the valid DL subframes.

2. The method of claim 1, wherein the plurality of serving cells include the primary cell in which the user equipment performs an initial connection establishment procedure or a connection re-establishment procedure with respect to a base station and the secondary cell which is additionally allocated in addition to the primary cell.

3. The method of claim 1, wherein scheduling information for the secondary cell is received through the primary cell.

4. The method of claim 3, wherein ACK/NACK for a data unit received in the secondary cell is transmitted through the primary cell.

5. The method of claim 1, wherein the cell-specific UL-DL configuration and the reference UL-DL configuration are applied respectively for the primary cell and the secondary cell.

6. The method of claim 5, wherein the reference UL-DL configuration for the primary cell is equal to the reference UL-DL configuration for the secondary cell.

7. The method of claim 1, wherein the cell-specific UL-DL configuration and the reference UL-DL configuration are selected from UL-DL configurations of the following table

| Uplink-downlink configuration | Downlink-to-Uplink Switch-point periodicity | Subframe n | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |
| 7 | N/A | D | D | D | D | D | D | D | D | D | D |

8. A user equipment comprising:
    a radio frequency (RF) unit for transmitting and receiving a radio signal; and
    a processor operatively coupled to the RF unit,
    wherein the processor is configured for:
    receiving a cell-specific uplink (UL)-downlink (DL) configuration for a secondary cell among the plurality of serving cells,
    wherein the cell-specific UL-DL configuration is information which configures subframes in a frame of the secondary cell to a UL subframe or a DL subframe;
    receiving a reference UL-DL configuration for the secondary cell,
    wherein the reference UL-DL configuration is information which indicates an ACK/NACK transmission time by configuring the subframes in the frame to the UL subframe or the DL subframe;
    determining valid DL subframes capable of actually receiving a data unit in the secondary cell on the basis of the cell-specific UL-DL configuration and the reference UL-DL configuration; and
    constructing ACK/NACK only for the valid DL subframes in a form of a bit-stream and feed-backing the bit-stream,
    wherein the reference UL-DL configuration for the secondary cell is a cell-specific UL-DL configuration for a primary cell, and
    wherein, when the primary cell uses a time division duplex (TDD) frame and the secondary cell uses a frequency division duplex (FDD) frame, a DL subframe which overlaps with a UL subframe of the TDD frame among DL subframes included in the FDD frame is excluded from the valid DL subframes.

* * * * *